(12) United States Patent
Tamachi et al.

(10) Patent No.: US 8,797,716 B2
(45) Date of Patent: Aug. 5, 2014

(54) ELECTROCHEMICAL CELL

(75) Inventors: Tsuneaki Tamachi, Chiba (JP); Ryo Sato, Chiba (JP); Isamu Shinoda, Chiba (JP); Shunji Watanabe, Chiba (JP)

(73) Assignee: Seiko Instruments Inc., Chiba (JP)

( * ) Notice: Subject to any disclaimer, the term of this patent is extended or adjusted under 35 U.S.C. 154(b) by 256 days.

(21) Appl. No.: 13/273,839

(22) Filed: Oct. 14, 2011

(65) Prior Publication Data
US 2012/0092809 A1 Apr. 19, 2012

(30) Foreign Application Priority Data

Oct. 15, 2010 (JP) .................................. 2010-232522
Aug. 5, 2011 (JP) .................................. 2011-172086

(51) Int. Cl.
| H01G 9/00 | (2006.01) |
| H01G 11/74 | (2013.01) |
| H01G 11/80 | (2013.01) |
| H01G 11/70 | (2013.01) |

(52) U.S. Cl.
CPC ............... *H01G 11/74* (2013.01); *H01G 9/155* (2013.01); *H01G 11/80* (2013.01); *H01G 11/70* (2013.01); *Y02E 60/13* (2013.01)
USPC ...................................................... 361/502

(58) Field of Classification Search
CPC ....... H01G 9/155; H01G 11/80; H01G 11/78; H01G 11/82; H01G 11/74
USPC ....................................................... 361/502
See application file for complete search history.

(56) References Cited

U.S. PATENT DOCUMENTS

| 4,663,824 | A | * | 5/1987 | Kenmochi | .................... | 29/25.03 |
| 4,882,115 | A | * | 11/1989 | Schmickl | ...................... | 361/538 |
| 6,313,525 | B1 | * | 11/2001 | Sasano | .......................... | 257/704 |
| 6,445,566 | B2 | | 9/2002 | Watanabe et al. | | |
| 8,248,759 | B2 | * | 8/2012 | Sato et al. | ...................... | 361/520 |
| 2010/0183915 | A1 | * | 7/2010 | Tamachi et al. | ................ | 429/185 |
| 2010/0188800 | A1 | * | 7/2010 | Ashizaki et al. | ............. | 361/502 |
| 2011/0128673 | A1 | * | 6/2011 | Lee et al. | ...................... | 361/502 |

FOREIGN PATENT DOCUMENTS

| JP | 2001-216952 | A | | 8/2001 |
| JP | 2005135726 | A | * | 5/2005 |
| JP | 2005158700 | A | * | 6/2005 |
| JP | 2005209640 | A | * | 8/2005 |
| JP | 2006128080 | A | * | 5/2006 |
| JP | 2006128089 | A | * | 5/2006 |
| JP | 2006236699 | A | * | 9/2006 |
| JP | 2007201382 | A | * | 8/2007 |
| JP | 2007207920 | A | * | 8/2007 |
| JP | 2007214391 | A | * | 8/2007 |
| JP | 2009267572 | A | * | 11/2009 |
| JP | 2010161097 | A | * | 7/2010 |

OTHER PUBLICATIONS

Machine translation of JP2007207920 published in 2007.*

* cited by examiner

*Primary Examiner* — David M Sinclair
(74) *Attorney, Agent, or Firm* — Brinks Gilson & Lione

(57) ABSTRACT

An electric double-layer capacitor is provided in which an upper end portion of a recessed container is sealed by a sealing plate. An electrode and an electrode are accommodated in a hollow portion formed by a recessed portion and the sealing plate. One step portion is formed in the middle of one inner peripheral surface of the recessed portion, and another step portion is formed in the middle of the other opposing inner peripheral surface. The one step portion and said another step portion are formed at the same height, and upper surfaces of those step portions exist on the same plane.

6 Claims, 24 Drawing Sheets

FIG. 1 6 A
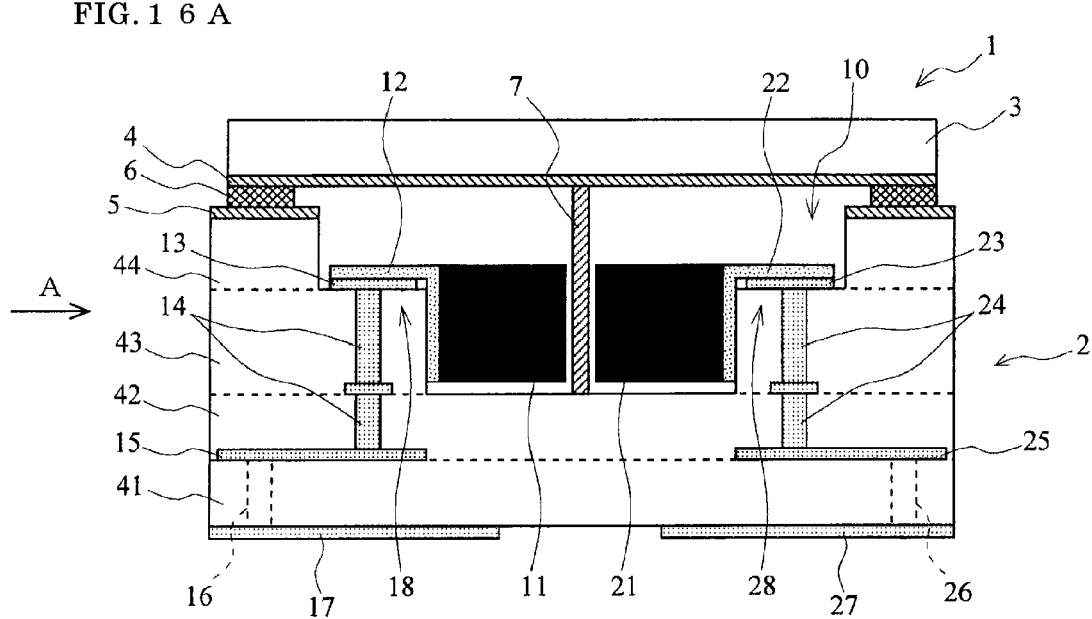
FIG. 1 6 B
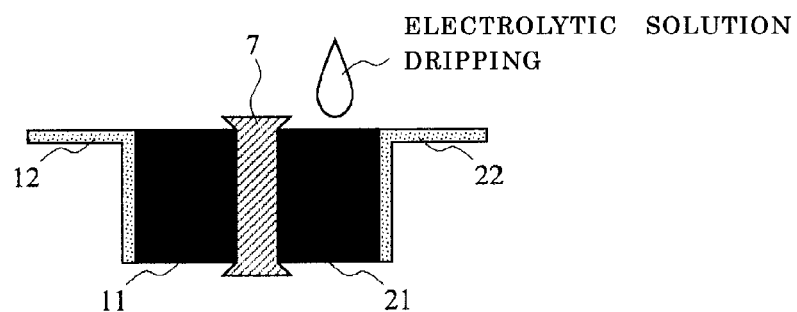
ELECTROLYTIC SOLUTION DRIPPING

ELECTROCHEMICAL CELL

RELATED APPLICATIONS

This application claims priority under 35 U.S.C. §119 to Japanese Patent Application Nos. 2010-232522 filed on Oct. 15, 2010 and 2011-172086 filed on Aug. 5, 2011, the entire contents of which are hereby incorporated by reference.

BACKGROUND OF THE INVENTION

1. Field of the Invention

The present invention relates to an electronic component and an electronic device, and more particularly, to an electrochemical cell such as an electric double-layer capacitor.

2. Description of the Related Art

The electric double-layer capacitor is a device which is charged through polarization of ions in an electrolyte and discharged, thereby supplying electric power.

The electric double-layer capacitor is characterized by this charging/discharging function, and hence is used, for example, in backup power sources for a clock function and a semiconductor memory for electronic devices, or used in standby power sources for electronic devices such as microcomputers and IC memories.

In particular, the electric double-layer capacitor capable of surface mounting can be downsized and reduced in thickness, and hence is suitable for thin mobile terminals.

In order to meet such demands for downsizing and reduction in thickness, the following Japanese Patent Application Laid-open No. 2001-216952 proposes an electric double-layer capacitor in which a polarizable electrode and an electrolyte are accommodated in a container including a recessed portion and an opening portion is sealed with a sealing plate.

FIG. 24 is a cross-sectional view of a conventional electric double-layer capacitor 100.

On a bottom surface of a recessed container 102, which has formed therein a recessed portion 110 having inner walls perpendicular to the bottom surface and is made of a ceramics, a metallic layer 126 is provided. An electrode 121 (positive electrode) is bonded onto an upper surface of the metallic layer 126.

The metallic layer 126 passes through the recessed container 102 to be electrically connected to an external electrode 127 on a rear surface of the recessed container 102. In this manner, the electrode 121 is electrically connected to the external electrode 127 via the metallic layer 126.

A sealing plate 103, made of metal, is bonded to an upper end portion of the recessed container 102 via a bonding metallic layer 106, thereby sealing the recessed portion 110. Note that, a metallic layer 104 is formed on a lower surface of the sealing plate 103, and the metallic layer 104 is bonded onto the bonding metallic layer 106.

On a side surface of the recessed container 102, there is formed a metallic layer 116 that connects the bonding metallic layer 106 to an external electrode 117 provided on the bottom surface of the recessed container 102.

An electrode 111 (negative electrode) is bonded onto the metallic layer 104 provided on the lower surface of the sealing plate 103, and is electrically connected to the external electrode 117 via the metallic layer 104, the bonding metallic layer 106, and the metallic layer 116.

Between the electrode 111 and the electrode 121, there is provided a separator 107 for preventing the electrodes from short-circuiting, and further, an electrolyte is sealingly filled in the recessed portion 110.

The electric double-layer capacitor 100 thus structured stores charges when a voltage is applied to the external electrodes 117 and 127, and releases the stored charges to supply power for maintaining a clock function, to supply power to a memory, and to supply power for other purposes.

However, the electric double-layer capacitor 100 is manufactured in a manner that the electrode 111 is strongly adhered by a conductive adhesive onto the sealing plate 103 with its lower surface facing upward, and thereafter the sealing plate 103 is turned upside down to seal the recessed container 102. This process complicates the manufacturing steps and is responsible for lowered yields.

SUMMARY OF THE INVENTION

The present invention has an object to provide an electric double-layer capacitor which may be easily manufactured.

According to a first aspect of the present invention, there is provided an electronic component, including: a recessed container including a recessed portion, the recessed portion having a step portion formed between a bottom surface and an upper end portion; a first conductor, which reaches an outside of the recessed container from an upper surface of the step portion; a second conductor, which reaches the outside of the recessed container from the upper surface of the step portion; a first electrode, which is connected to the first conductor on the upper surface of the step portion; a second electrode, which is connected to the second conductor on the upper surface of the step portion; an electrolyte in contact with the first electrode and the second electrode; and a sealing member, which is bonded onto the upper end portion of the recessed portion, for sealing the recessed portion.

According to a second aspect of the invention, in the first aspect of the invention, the recessed container is formed by laminating sheet materials corresponding to a shape of the recessed portion.

According to a third aspect of the invention, in the first aspect of the invention, the electronic component further includes: a first collector, which is placed on the first electrode; and a second collector, which is placed on the second electrode, in which the first electrode is connected to the first conductor via the first collector, and the second electrode is connected to the second conductor via the second collector.

According to a fourth aspect of the invention, in the first aspect of the invention: the step portion includes a first step portion and a second step portion; and the first conductor is formed on the first step portion, and the second conductor is formed on the second step portion.

According to a fifth aspect of the invention, in the fourth aspect of the invention, an upper surface of the first step portion and an upper surface of the second step portion are formed on the same plane.

According to a sixth aspect of the invention, in the first aspect of the invention, the first conductor is formed on one side of the step portion, and the second conductor is formed on another side of the step portion.

According to a seventh aspect of the invention, in the first aspect of the invention, the first electrode and the second electrode are opposed to each other in one of a depth direction of the recessed portion and a direction perpendicular to the depth direction, and the electrolyte exists at least between opposing surfaces of the first electrode and the second electrode.

According to an eighth aspect of the invention, in the first aspect of the invention, each of the first conductor and the second conductor forms wiring of predetermined layout in a wiring layer formed between the bottom surface of the recessed portion and a peripheral bottom surface of the recessed container, and is connected to an external electrode which is formed at a predetermined position of the peripheral bottom surface of the recessed container.

According to a ninth aspect of the invention, in the eighth aspect of the invention: the recessed container includes a bottom surface of a rectangular shape; and the external electrode includes: a first external electrode, which is formed at each of corner parts on one of two diagonals of the bottom surface and is connected to the first conductor; and a second external electrode, which is formed at each of corner parts on another of the diagonals and is connected to the second conductor.

According to a tenth aspect of the invention, there is provided an electronic device, including: the electronic component according to the first aspect of the invention; charging means for charging the electronic component; another electronic component exerting a predetermined function; and power supply means for supplying power to the another electronic component with use of electric charge that is stored by the charging means.

According to the present invention, the step portion is provided in the recessed portion to dispose the electrodes. In this manner, it is possible to easily manufacture the electric double-layer capacitor and the like.

BRIEF DESCRIPTION OF THE DRAWINGS

In the accompanying drawings:

FIGS. 16A and 16B are side cross-sectional views of an electric double-layer capacitor in the lateral direction according to an eleventh modified example of the present invention;

Figure 1A:
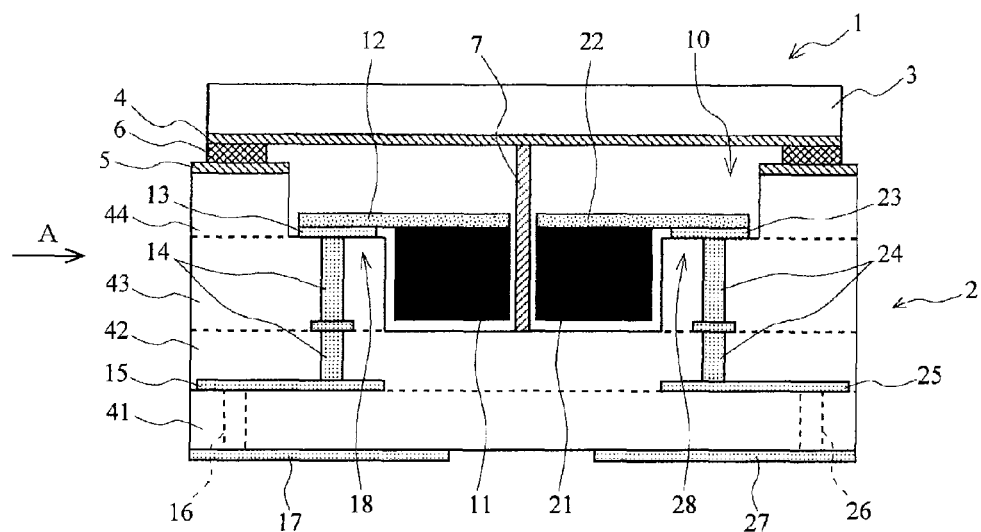
FIGS. 1A to 1C are cross-sectional views of an electric double-layer capacitor according to an embodiment of the present invention.

DETAILED DESCRIPTION OF THE PREFERRED EMBODIMENT (1) Summary of Embodiment

In an electric double-layer capacitor 1 (FIG. 1A), an upper end portion of a recessed container 2 is sealed by a sealing plate 3, and an electrode 11, an electrode 21, and the like are accommodated in a hollow portion formed by a recessed portion 10 and the sealing plate 3.

In the middle of one inner peripheral surface of the recessed portion 10 (one of the four inner side surfaces forming the recessed portion), a step portion 18 is formed. In the middle of the other opposing inner peripheral surface, a step portion 28 is formed. The step portion 18 and the step portion 28 are formed at the same height, and upper surfaces of those step portions exist on the same plane. Note that, the step portion 18 and the step portion 28 are not necessarily formed on the same plane but the difference may be provided in height from a bottom surface of the step portion.

On the step portion 18, a collector 12 of the electrode 11 is bonded, and the electrode 11 is electrically connected to an external electrode 17 via the collector 12, a collector electrode 13, a through electrode portion 14, an intermediate wiring portion 15, and a side-surface wiring portion 16.

Similarly, on the step portion 28, a collector 22 of the electrode 21 is bonded, and the electrode 21 is electrically connected to an external electrode 27 via the collector 22, a collector electrode 23, a through electrode portion 24, an intermediate wiring portion 25, and a side-surface wiring portion 26.

Further, in the recessed portion 10, a separator 7 for preventing contact between the electrode 11 and the electrode 21, an electrolyte, and the like are also sealingly filled.

The electric double-layer capacitor 1 is manufactured in a manner that the collector 12 of the electrode 11 and the collector 22 of the electrode 21 are mounted onto the step portion 18 and the step portion 28 in the recessed container 2, respectively, and thereafter the separator 7 is placed and the electrolyte is injected, followed by sealing with the sealing plate 3.

In this way, the manufacture of the electric double-layer capacitor 1 can be carried out from the upper side of the recessed container 2, thus facilitating manufacturing work and simplifying manufacturing steps.

Alternatively, the electric double-layer capacitor 1 may be manufactured in a manner that a part of at least one of the electrode 11 or the electrode 21 and the collector 12 or the collector 22 is wrapped by the separator 7 in advance before the collector 22 of the electrode 21 is mounted. This manner can prevent cumbersome work for the separator 7 in assembly and prevent short-circuit.

Still alternatively, the electrode 11, the separator 7, and the electrode 21 may be integrated (as a module) before being inserted into the recessed container 2.

(2) Details of Embodiment

Description is made of an electrochemical cell constituting an electronic component in this embodiment with reference to the drawings.

Note that, in the following, although description is made of the electric double-layer capacitor as an embodiment, the electronic component may include electrochemical cells of other types, such as a non-aqueous electrolytic cell.

FIG. 1A is a side cross-sectional view of the electric double-layer capacitor 1 according to this embodiment. The electric double-layer capacitor 1 has a rectangular-parallelepiped shape, and is, for example, 1 (mm) or less in the height direction, approximately 2.5 (mm) in the lateral direction, and approximately 3.0 (mm) in the longitudinal direction. FIG. 1A illustrates a cross section in the lateral direction.

The electric double-layer capacitor 1 includes a casing structured with the recessed container 2, the sealing plate 3, a metallic layer 4, a seal ring 6, and a metallic layer 5. Provided therein is the electrode 11, the electrode 21, the collector 12, the collector 22, the collector electrode 13, the collector electrode 23, the separator 7, the through electrode portion 14, the through electrode portion 24, the intermediate wiring portion 15, and the intermediate wiring portion 25. Also provided on the side surface of the recessed container 2 are the side-surface wiring portion 16 and the side-surface wiring portion 26. Further, provided on the peripheral bottom surface of the recessed container 2 are the external electrode 17 and the external electrode 27.

Hereinafter, a side of the external electrode 17 and the external electrode 27 is assumed as a lower direction, and a side of the sealing plate 3 is assumed as an upper direction.

Note that, in the electric double-layer capacitor 1 to be described with reference to FIGS. 1A to 1C and other drawings, for easy understanding of the bonding relationship of the members, gaps are illustrated among the sealing plate 3, the collectors 12 and 22, the electrodes 11 and 21, the separator 7, and the recessed portion 10, but the gaps may be eliminated in a part or all of the gap portions.

Figure 1B:
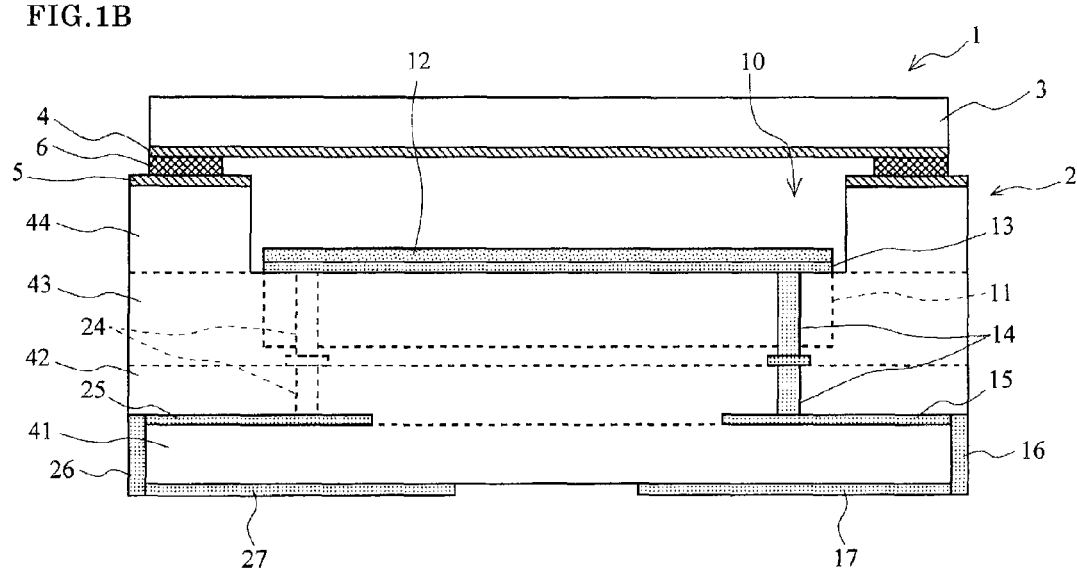
Figure 1C:
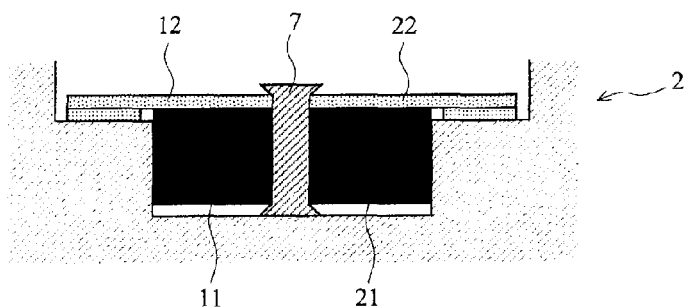

For example, as illustrated in FIG. 1C, the separator 7 is in contact with both the electrodes 11 and 21 as being compressed and crushed by the electrode 11 and the electrode 21, and each of the electrode 11 and the electrode 21 is in contact with the inner side surface of the recessed container 2 at the other three surfaces than the surface contacting the separator 7.

In FIG. 1C, the gaps are formed between bottom surfaces of the electrode 11 and the electrode 21 and the bottom surface of the recessed container 2 by the length that the separator 7 protrudes out of the electrodes 11 and 21. The upward and downward protrusions of the separator 7 result in necessary gaps for preferentially preventing short-circuit between both the electrodes 11 and 21.

Note that, FIG. 1C illustrates an example of the case of using the separator 7 that may be compressed by pressure of the electrodes 11 and 21 (e.g., a separator made of nonwoven cloth, cellulose-based material, or glass fiber). In another case of using a separator that is not crushed by being compressed by the electrodes 11 and 21, the electrode 11 and the separator 7 and the electrode 21 and the separator 7 are brought into contact with each other, respectively.

The recessed container 2 includes the recessed portion 10 having a rectangular cross-section as viewed from above.

In the middle of one inner peripheral surface of the recessed portion 10, the step portion 18 is formed. In the middle of the other opposing inner peripheral surface, the step portion 28 is formed.

The upper surfaces (upper end surfaces) of the step portion 18 and the step portion 28 are at the same height, and the upper surfaces of the step portion 18 and the step portion 28 exist within the same plane.

The heights of the upper surfaces of the step portion 18 and the step portion 28 are equal to each other, which facilitates height adjustment of a manufacturing machine in the assembly work for the step portion 18 and the step portion 28.

The recessed container 2 is made of, for example, a ceramics containing an alumina component at 30 wt % or more, and is formed by laminating ceramics sheet materials 41 to 44 having flexibility, called green sheets, and baking and integrating the sheet materials. The ceramics desirably contains an alumina component at 60 wt % or more, more desirably 90 wt % or more. A ceramics containing an alumina component at 99.7 wt % or more can significantly enhance the strength, but in this case, cost increases. In this embodiment, the number of the laminated green sheets is four, but may be increased more.

Further, for example, the ceramics sheet materials 41 and 42 may be integrated as one sheet so that the number of the laminated green sheets may be reduced to three or less.

The thickness of each of the sheets after baking is, for example, about 100 to 400 μm, and the thickness of the wall of the side surface is, for example, about 100 to 500 μm. In FIG. 1A, bonding portions between the sheet materials 41 to 44 are illustrated as broken lines.

Each of the sheet material 43 and the sheet material 44 has formed therein an opening portion corresponding to the shape of the recessed portion 10.

The opening portion of the sheet material 43 is formed smaller than the opening portion of the sheet material 44 by the dimensions of the step portion 18 and the step portion 28. Thus, by laminating and baking the sheet materials 41 to 44, the recessed container 2 is formed, including the recessed portion 10 in which the step portion 18 and the step portion 28 are formed.

In this way, the recessed container 2 is formed by laminating the sheet materials, which facilitates the formation of the shape of steps.

The description above is directed to the case where the recessed container 2 is formed by laminating a plurality of sheet materials, but alternatively, the recessed container 2 having the step portions may be integrally formed by other materials. For example, the recessed container 2 having the step portions may be constituted by a ceramics (HTCC) whose main component is alumina or by a heat resistant material such as a heat resistant resin, glass, ceramic glass, or low temperature co-fired ceramics (LTCC).

In the case of forming the recessed container 2 by glass or glass ceramics, wiring is performed on low melting point glass or glass ceramics by conductor printing of a low melting point metallic material whose main component is silver (melting point: 961.93° C.), and after the lamination, baking is carried out at low temperature.

On the upper end of the recessed container 2, there is formed a metallization layer, serving as the metallic layer 5, for brazing of the sealing plate 3. The metallization layer has the area larger than at least the base area of the sealing ring 6, and is formed in the shape of "hollow square" so as to surround the periphery.

Further, on an upper surface of the metallization layer, the sealing ring 6 for ensuring airtightness between the sealing plate 3 and the recessed container 2 is provided around the entire periphery.

As the sealing ring 6, a nickel-based alloy can be used. Examples of the nickel-based alloy include Kovar (alloy of Co at 17 wt %, Ni at 29 wt %, and Fe for the rest) and a 42-alloy (alloy of Ni at 42 wt % and Fe for the rest). On the surface of Kovar, a single or a plurality of metals such as nickel, gold, and tin are laminated and subjected to electrolytic or electroless plating.

Available brazing materials for bonding between the metallic layer 5 and the sealing ring 6 include a copper-alloy brazing material such as gold brazing or silver brazing (e.g., silver-copper (Ag—Cu) brazing) and a solder material.

Note that, the surface of the metallic layer 5 and the surface of the sealing ring 6 are subjected to nickel plating. Further, the upper surfaces thereof are subjected to gold plating.

The electrode 11 is formed by mixing an electrode active material binder whose main component is activated carbon together with a conductive assistant and forming the mixture into a sheet shape, followed by cutting. The electrode 11 has a rectangular-parallelepiped shape extending in the longitudinal direction of the electric double-layer capacitor 1. Note that, the electrode 11 may be formed into a columnar shape.

As the electrode 11, for example, there may be used carbides of a coconut shell, which is a natural material, and carbides of a coal pitch, a petroleum pitch, and a phenolic resin, which are artificial materials, the carbides being respectively activated by moisture, a chemical agent, or by an electrical method. The electrode 21 has the same structure.

This embodiment exemplifies the electrode 11 as a negative electrode and the electrode 21 as a positive electrode. In the electric double-layer capacitor 1 according to this embodiment, however, the negative electrode and the positive electrode are formed symmetrically, and hence the electrode 11 may be a positive electrode and the electrode 21 may be a negative electrode.

Note that, as described later, a positive one of the collector electrodes 13 and 23 has a fear of dissolving when applied with a voltage under a state in contact with the electrolyte. Responding to this, a positive one of the collector electrodes uses a material such as aluminum and is subjected to coating by vacuum vapor deposition or high-frequency ion plating. The collector electrode 13 and the collector electrode 23 can be respectively welded onto the collector 12 and the collector 22, which are described later, by resistance welding or laser welding. Therefore, the collector electrode 13 and the collector electrode 23 only need to have the thickness of 0.1 μm or more.

In the electric double-layer capacitor 1, the same material, such as aluminum, can be used for the collectors of both the positive electrode and the negative electrode. In the case of constituting a battery using the same structure as that of the electric double-layer capacitor 1, the collector electrode 23 and the collector 22 on the positive electrode side can use aluminum while the collector electrode 13 and the collector 12 on the negative electrode side can use a metallic material containing copper or nickel as a material other than aluminum. Each of the collector 12 and the collector 22 can be formed to a desired thickness, and the thickness is preferably 10 μm or more, more preferably 20 μm or more. Increasing the thickness to 30 μm or more reduces an effective volume of the electrode 11 or the electrode 21, which is undesired. As the collector electrode 13 and the collector electrode 23, punching metal, expanded metal, or a metal foam can be used. In addition, after the electrode material is applied onto the collector, as necessary, it is possible to use a rolling mill roll to carry out such processing that increases the density of electrodes or collectors and removes a burr in the electrode. This process enables resistance welding.

As described later with reference to FIG. 17C, a mat made of an insulating material serving to supplement (reserve) an electrolytic solution and also serving for insulation may be disposed between the collector 12 and/or the collector 22 and the sealing plate 3. The material of the mat may be the same as the separator 7.

The collector 12 is a conductive member, such as an aluminum foil, at least one side of which is bonded onto the upper surface of the electrode 11 while the other is bonded onto the upper surface of the collector electrode 13. In bonding for those, for example, a conductive adhesive containing carbon can be used. Similarly, the collector 22 is bonded onto the electrode 21 and the collector electrode 23. As carbon used, black lead and carbon black may be mixed. As a binding agent for the conductive adhesive, a thermosetting resin can be used.

For example, in the case of using an aluminum foil as the collector 12, the thickness of the aluminum foil is desirably 5 to 40 μM, more preferably 10 to 20 μm.

In this case, the tensile strength of the aluminum foil is desirably 150 N/mm2 or more, more preferably 170 N/mm$^2$ or more, the value of which can be set to 500 N/mm$^2$ or less.

Further, the proof stress of the aluminum foil is desirably 120 N/mm$^2$ or more, more preferably 150 N/mm$^2$ or more, the value of which can be set to 200 N/mm$^2$ or less.

In addition, breaking elongation in a tensile test is 1.5% or more and less than 4%, more preferably 1.9% or more and less than 2.5%.

Regarding the chemical composition of the aluminum foil, the purity is desirably 95.0% or more, more preferably 99.65% or more.

In the positive electrode, the contents of impurities are desirably lower. The contents are desirably less than 0.15% of silicon (Si), less than 1.7% of iron (Fe), less than 0.10% of copper (Cu), less than 0.05% of manganese (Mn), and less than 0.10% of zinc (Zn).

More preferably, the contents are less than 300 ppm of silicon (Si), less than 700 ppm of iron (Fe), and less than 30 ppm of copper (Cu).

Meanwhile, for example, in the case of using a negative collector for applications including lithium-ion batteries and lithium-ion capacitors, when a copper foil is used for the negative collector 22, the thickness of the copper foil is desirably 4 to 40 μm, more preferably 10 to 15 μm.

In this case, the tensile strength of the copper foil is desirably 150 N/mm$^2$ or more, more preferably 250 N/mm$^2$ or more, the value of which may be set to 600 N/mm$^2$ or less.

Further, breaking elongation in a tensile test is 0.05% or more and less than 25%, more preferably 1% or more and less than 20%.

Regarding the chemical composition of the copper foil, the purity is desirably 95.0% or more, more preferably 99.96% or more.

Accordingly, an electrolytic copper foil or a rolled copper foil is desired. In the positive electrode, the contents of impurities are desirably lower. The contents are desirably less than 0.5% of chromium (Cr), less than 0.5% of tin (Sn), and less than 0.5% of zinc (Zn).

As described above, the electrode 11 and the electrode 21 are fixed to the collector electrode 13 and the collector electrode 23 via the collector 12 and the collector 22, respectively, and are disposed at a predetermined distance in the recessed portion 10.

In this way, according to this embodiment, the collector 12 and the collector 22 are fixed to the step portion 18 and the step portion 28 formed in the middle of the recessed portion 10, respectively, and hence the amounts of deformation of the collector 12 and the collector 22 are small so that a stress to be applied to the collector 12 and the collector 22 and a stress applied to the electrode 11 and the electrode 21 may be reduced.

Note that, in the electric double-layer capacitor 1, the collector 12 and the collector 22 are aluminum foils, but in the case of constituting a battery using the same structure as that of the electric double-layer capacitor 1, the positive electrode side is an aluminum foil and the negative electrode side is a copper foil or a nickel foil.

The collector electrode 13 is a metallic layer formed on the upper surface of the step portion 18, and is formed by performing conductor printing on the upper surface of the step portion 18 and baking the recessed container 2 thereafter. The metallic layer may further be protected by a conductive resin. In this case, the conductive resin can use a similar composition as that of the conductive adhesive.

The conductor printing is performed by, for example, screen printing which is conducted with the use of ink containing a high melting point metallic material which can withstand baking of the recessed container 2 and is corrosion resistant such as tungsten or molybdenum.

Tungsten and molybdenum are suitable for the electrode to be formed in the recessed portion 10 because tungsten or molybdenum have a high melting point, do not easily oxidize, have moderate adhesion intensity with a ceramic surface, and have a practicable electric resistance even after baking. The thickness of the metal layer formed during conductor printing of the collector electrode 13 or the like may be within the range of 0.1 μm to 20 μm.

The structure of the collector electrode 23 is similar to the structure of the collector electrode 13.

Note that, in the case of using tungsten or molybdenum as the positive collector, because tungsten or molybdenum dissolves electrochemically in the electrolyte when applied with a voltage under the state in contact with the electrolyte, it is necessary to provide a protective film on a portion of the surface of the collector electrode 23 (to be used on the positive electrode side) which is brought into contact with at least the electrolyte. For example, in the case of the electric double-layer capacitor, a coated film of aluminum can be formed by vacuum vapor deposition or the like.

Further, in the case of constituting a battery using the same structure, the positive electrode side may be aluminum, and the protective film can be formed on the negative electrode side by a coated film of copper or nickel.

In addition, the protective film may be formed by carbon instead of a metallic material, and a conductive paste containing a carbon material may be formed in advance as the protective film.

The through electrode portion 14 is a columnar conductor passing through the sheet materials 42 and 43, the upper end side of which is bonded onto the collector electrode 13 and the lower end side is bonded onto the intermediate wiring portion 15. The through electrode is also called via. In this way, the through electrode portion 14 is formed across the plurality of sheet materials.

The through electrode portion 14 is formed in a manner that through holes are formed in the sheet materials 42 and 43 in advance, and a paste containing tungsten or molybdenum is injected in the through holes and then cured at the time of ceramics sintering, a conductive paste is injected in the through holes and cured, the inner surfaces of the through holes are subjected to electrolytic or electroless plating or electroforming, or a columnar metallic member is inserted in the through holes. Depending on the material of sheets to be described later, the through electrode portion 14 may be produced by using Ag brazing or the like, and a protective layer may be formed only on the surface contacting the electrolytic solution. As the protective layer in this case, a conductive paste containing carbon filler can be used.

At the boundary between the sheet material 42 and the sheet material 43, an auxiliary electrode portion is provided so that an electrical connection of the through electrode portion 14 at the boundary may further be ensured.

The lower end of the through electrode portion 14 is bonded onto the intermediate wiring portion 15, and hence even when the electric double-layer capacitor 1 is heated and a vapor pressure of the electrolyte in the recessed portion 10 becomes higher, it is possible to prevent slip-out of the through electrode portion 14.

The through electrode portion 24 has the same structure, in which the upper end side of the through electrode portion 24 is bonded to the collector electrode 23 and the lower end side is bonded to the intermediate wiring portion 25.

Note that, as described later, the through electrode portion 24 includes two through electrode portions 24a and 24b.

The intermediate wiring portion 15 is a metallic layer formed on the upper surface of the sheet material 41, and has a wiring pattern to be described later.

The intermediate wiring portion 15 is formed by the same method as that of the collector electrode 13, that is, formed by performing conductor printing on the surface of the material 41 and laminating the sheet materials 41 to 44, followed by baking the laminate. The intermediate wiring portion 25 has the same structure.

Note that, as described later, the intermediate wiring portion 25 includes two intermediate wiring portions 25a and 25b, which are simply referred to as intermediate wiring portion 25 when distinction therebetween is unnecessary.

The side-surface wiring portion 16 is a metallic layer formed on the side surface of the sheet material 41, and electrically connects the intermediate wiring portion 15 and the external electrode 17 to each other.

The side-surface wiring portion 16 is formed on the side surface in the lateral direction, that is, on the upper or lower side of the sheet, and is therefore illustrated by broken lines.

The side-surface wiring portion 16 is formed by performing conductor printing in a groove formed in the side surface of the sheet material 41 in the lateral direction similarly to the collector electrode 13, followed by baking.

In this way, the side-surface wiring portion 16 is formed on the side surface of the sheet material 41, and hence the region where solder may creep up at the time of surface-mounting can be restricted to the side surface of the sheet material 41, thus preventing short-circuit due to creeping of solder.

The side-surface wiring portion 26 is structured similarly to the side-surface wiring portion 16, and electrically connects the intermediate wiring portion 25 and the external electrode 27 to each other.

Note that, as described later, the side-surface wiring portion 16 includes two side-surface wiring portions 16a and 16b, and the side-surface wiring portion 26 includes two side-surface wiring portions 26a and 26b. Those are simply referred to as side-surface wiring portion 16 and side-surface wiring portion 26, respectively, when particular distinction therebetween is unnecessary.

The external electrode 17 is an electrode used for surface-mounting the electric double-layer capacitor 1 on a printed board.

The external electrode 17 is formed by performing conductor printing using ink containing tungsten or molybdenum and baking, and thereafter subjecting the surface thereof to plating of gold, nickel, tin, or the like. Examples of the plating include electroplating and electroless plating. Alternatively, a gas phase method such as vacuum vapor deposition may be used to form the external electrode 17.

For example, in the case of nickel plating, the plating thickness can be set to 0.1 to 10 μm.

Further, in this case, it is desired to perform electrolytic nickel plating, because a plated film having less pinholes can be formed.

In addition, in the case of gold plating, the thickness can be set to 0.05 to 1.0 μm. More desirably, the thickness is set to 0.5 to 0.7 μm.

In this case, after the nickel plating or gold plating, a pore sealing agent (such as CT88S produced by Nippon Mining & Metals Co., Ltd.) can be used.

In this way, high solder wettability on the external electrode 17 can be ensured, and hence the electric double-layer capacitor 1 can be surface-mounted onto a board satisfactorily.

In this embodiment, the external electrode 17 is provided to the outer bottom surface portion of the recessed container 2, but may be formed on the outer side surface portion or may be formed continuously from the outer bottom surface to the side surface.

Note that, although described later in detail, the external electrode 17 includes two external electrodes 17a and 17b which are respectively formed on the diagonals on the bottom surface of the recessed container 2. Hereinafter, the external electrode 17a and the external electrode 17b are simply referred to as external electrode 17 when distinction therebetween is unnecessary.

The external electrode 27 has the same structure as that of the external electrode 17.

In this way, the electrode 11 is electrically connected to the external electrode 17 via the collector 12, the collector electrode 13, the through electrode portion 14, the intermediate wiring portion 15, and the side-surface wiring portion 16, and the electrode 21 is electrically connected to the external electrode 27 via the collector 22, the collector electrode 23, the through electrode portion 24, the intermediate wiring portion 25, and the side-surface wiring portion 26.

The separator 7 is provided between the electrode 11 and the electrode 12 so as to prevent short-circuiting caused by contact of the electrode 11 and the electrode 12.

The separator 7 separates a positive electrode and a negative electrode from each other in an electrochemical cell. The material used therefor is an electrical insulator that is capable of containing an electrolytic solution. Therefore, the separator 7 itself is in an insulated state, but has a liquid junction through which a solvent and a solute (ion) in the electrolytic solution communicates.

Examples of the materials for the separator 7 include a nonwoven cloth formed of a material obtained through impartment of a hydrophilic property with respect to surfaces of, for example, heat resistant resins such as polyphenylene sulfide (PPS), polyether ether ketone (PEEK), or denatured PEEK, a porous film made of polytetrafluoroethylene (PTFE) or a resin, and a glass fiber mat (filter paper or nonwoven cloth). Further, a cellulose-based separator may be used.

In the case of using a glass fiber, there may be used any one of borosilicate glass ($Na_2O$—$B_2O_3$—$SiO_2$), soda lime silica glass ($Na_2O$—$CaO$—$SiO_2$), silica glass ($SiO_2$), alkali-free glass (12:0-$Al_2O_3$—$SiO_2$, where R' represents a bivalent element), or a glass mat with the mixture thereof.

On this occasion, in order to improve handling in the capacitor process step, the strength of such glass fiber mat can be enhanced by using a binding agent of various kinds of materials including an organic substance or an inorganic substance such as liquid glass. Alternatively, instead of using a binding agent, the materials may be directly bonded to each other by fusion so as to enhance the strength of the glass fiber mat.

Note that, the separator 7 may be omitted in the case of a solid or gel electrolyte or in the case where the electrode 11 and the electrode 21 are each formed in such an integrated manner that the surface thereof does not fall off in the electrolyte.

It is preferred that, in addition to the function of preventing short-circuit between the electrode 11 and the electrode 21, the separator 7 have the function of containing more electrolyte, that is, a high liquid retaining function for the electrolyte. PTFE is used as the separator 7 of this embodiment, but a glass fiber is most desired in terms of liquid retaining function.

The electrolyte (not shown) is sealingly filled in a hollow portion formed by the recessed portion 10 and the sealing plate 3.

The electrolyte is formed of a solution obtained through, for example, dissolution of a supporting electrolyte such as N(CH3)4.BF4 into a non-aqueous solvent such as propylene carbonate (PC) or sulfolane (SL) at a concentration of 1 M/L.

The electrolyte may be used in a gel or solid form. Depending on sealing methods, when a liquid solvent is used as the electrolytic solution, it is desired that a boiling point be 200° C. or higher.

The above description is directed to the structure of the electric double-layer capacitor, but the same structure is also applicable to a battery, a lithium-ion battery, or a lithium-ion capacitor.

In this case, as the supporting electrolyte of the electrolytic solution, various kinds of alkali metal salts can be used, and, for example, an electrolytic solution in which $LiBF_4$, $LiPF_6$, $LiN(SO_2CF_3)_2$, or the like dissolves at a concentration of approximately 1 M/L may be used.

In addition, regarding an electrolyte, it is desired that a vapor pressure be not increased by heat applied for sealing.

An electrolytic solution may be added with a solvent having low boiling point of lower than 100° C., but an electrolytic solution whose vapor pressure at a melting point of metal or resin is measured as 0.2 MPa-G or lower at least during sealing is desired.

In injecting the electrolytic solution, the electrolyte can be impregnated into every part of the electrodes by carrying out depressurization or heating alone or a combination thereof after the electrolytic solution is injected into the recessed portion 10.

Specifically, the unit constituted by the electrodes 11 and 21, the separator 7, and the collectors 12 and 22 alone, or the unit being set in the recessed container 2 is put in a container for depressurization, followed by deaeration to a pressure of 0.1 atmosphere. After that, the electrolytic solution is injected. In this case, or under the deaerated state, the electrolytic solution may be warmed up to about 25° C. to about 100° C. so as to reduce the viscosity of the electrolytic solution. By reducing the viscosity, the electrolytic solution can be impregnated to the electrodes 11 and 21 and the separator 7 easily and promptly.

Further, although not illustrated, an impregnated member impregnated with an electrolyte, having electrically-insulating property and using heat resistant material, may be placed in a space between the collectors 12 and 22 and the sealing plate 3. The same material as that of the above-mentioned separator can be used as the material of the impregnated member.

With the impregnated member placed above the collector 12 and the collector 22, the collector 12 and the collector 22 can be fixed, and the sealing plate 3 and the collectors 12 and 22 can be prevented from contacting each other.

The sealing plate 3 is a metallic member made of Kovar or a 42-alloy. Kovar has a coefficient of thermal expansion that is substantially equal to that of ceramics, and hence can suppress a stress to be generated between the sealing plate 3 and the recessed container 2 when the electric double-layer capacitor 1 is heated at the time of sealing and reflow.

On the lower surface of the sealing plate 3, the metallic layer 4 by nickel plating is formed in order to bond the sealing plate 3 onto the sealing ring 6 satisfactorily.

When the metallic layer 4 is brazed to the sealing ring 6, the sealing plate 3 is bonded to the opening portion of the recessed portion 10.

In the brazing, the sealing plate 3 is heated while being applied with pressure so that nickel plating dissolves to bond the sealing plate 3 and the recessed container 2 to each other.

More specifically, parallel seam welding can be used, in which a roller electrode is brought into contact with the edge portion of the sealing plate 3 under a moderate pressure and is caused to rotatably run while being applied with power. The sealing ring 6 is heated due to the contact resistance, and therefore pressurization and heating are performed.

Instead of parallel seam welding, sealing may be performed in a manner that a sealing plate 3 formed of a metallic plate or laser transmission glass is irradiated with a pulsed laser while being applied with a pressure so that the metallic plate or the glass and the container are heat-welded.

In the case where the parallel seam welding is performed, materials of the seal ring 6 and the sealing plate 3 are desired to be selected from materials which go well together. For example, when electrolytic nickel or electroless nickel is used on the surface of the seal ring 6, the sealing plate 3 applied with electrolytic nickel or electroless nickel as the metallic layer 4 is used. With this, it is unnecessary to increase the welding power beyond necessity. When electroless nickel plating is used, it is desired that phosphorus be added in order to reduce the melting point.

Even the additive amount of phosphorus of 1% or more is desired because the effect of reducing the melting point is exhibited. 5% or more of addition is more desired because the melting point can be decreased to about less than 950° C. However, 12% or more of addition does not contribute to a large change in the effect of reducing the melting point but contrary increases electrical resistance, which is not preferred. Accordingly, the additive amount of phosphorus is desirably 5% or more and 11% or less.

Note that, in the electric double-layer capacitor 1, the sealing plate 3 does not function as a current path as in the conventional example, and hence various modifications can be made thereto.

For example, the metallic layer 5 and the metallic layer 4 may be directly brazed without using the sealing ring 6.

It is also possible to form the sealing plate 3 by a ceramics and bond the lower end surface of the sealing plate 3 and the upper end surface of the recessed container 2 to each other directly by a brazing material (such as silver brazing and gold brazing). In this case, the metallic layer 4, the sealing ring 6, and the metallic layer 5 are unnecessary. In particular, silver brazing and silver-copper brazing are inexpensive as compared to gold brazing and have low brazing temperature, and hence the use of silver brazing or silver-copper brazing attains cost reduction. Besides, the use of silver brazing or silver-copper brazing avoids the fear that Kovar-made sealing plate 3 dissolves excessively by high temperature.

It is also possible to form the sealing plate 3 by a ceramics and bond the lower end surface of the sealing plate 3 and the upper end surface of the recessed container 2 to each other directly by a brazing material (such as silver brazing and gold brazing). In this case, the metallic layer 4, the sealing ring 6, and the metallic layer 5 are unnecessary. In particular, silver brazing is inexpensive and has low brazing temperature, and hence the use of silver brazing attains cost reduction. Besides, the use of silver brazing avoids the fear that Kovar-made sealing plate 3 dissolves excessively by high temperature.

In addition, in the above description, the recessed container 2 is constituted by a ceramics, but may be constituted by a heat resistant material such as a heat resistant resin, glass, ceramic glass, or low temperature co-fired ceramics (LTCC). The sealing plate 3 may also be constituted by those materials.

In the case of forming the recessed container 2 by glass or glass ceramics, wiring is performed on low melting point glass or glass ceramics by conductor printing of a low melting point metallic material whose main component is silver, and after the lamination, baking is carried out at low temperature.

FIG. 1B is a side cross-sectional view of the electric double-layer capacitor 1 in the longitudinal direction as viewed in the direction of the arrow A of FIG. 1A.

As illustrated in FIG. 1B, the side-surface wiring portion 16 is formed by conductor printing in a groove formed in the side surface of the sheet material 41, and electrically connects the intermediate wiring portion 15 and the external electrode 17 to each other.

Similarly, the side-surface wiring portion 26 is formed by conductor printing in a groove formed in the side surface of the sheet material 41, and electrically connects the intermediate wiring portion 25 and the external electrode 27 to each other.

The electric double-layer capacitor 1 structured as described above is surface-mounted onto a board, with the external electrode 17 serving as a negative electrode and the external electrode 27 serving as a positive electrode, and can be used, for example, in backup power sources for a memory and a clock for various home appliances such as a smart meter, transport equipment such as an automobile, mobile phones, and other similar uses.

In this case, in the mobile phone, the electric double-layer capacitor 1 is charged simultaneously with the attachment of a main power battery and, when the battery is replaced or the main power voltage is reduced, the electric charges stored in the electric double-layer capacitor 1 are discharged, thereby supplying power to the memory or retaining the function of a clock and the like.

In addition, the electric double-layer capacitor 1 is capable of supporting power as an auxiliary function for a main power source in such equipment that consumes current instantaneously, such as an LED flash of a mobile phone.

Further, a lithium-ion battery can be constituted by using an electrode having a positive-electrode active material such as $Li_4Ti_5O_{12}$, $Li_4Mn_5O_{12}$, or $LiCoO_2$, a negative electrode containing Li—Si, Li—Si—O, Li—Al, or the like, and an electrolytic solution in which 1M of LiBF4 is dissolved in PC. In this case, a conductive assistant or a binding agent can be used in combination with each active material.

Figure 2A:
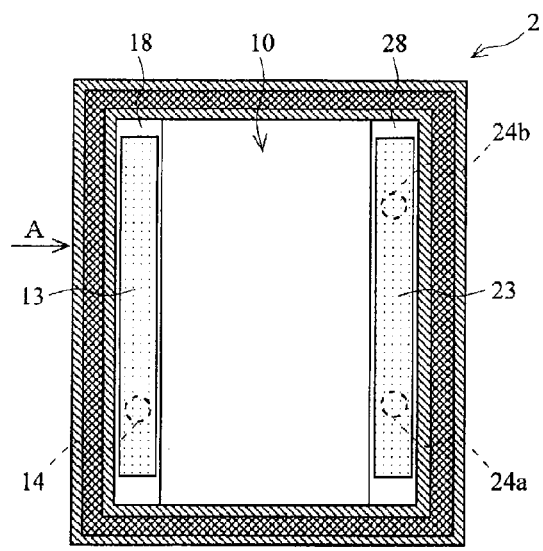
FIGS. 2A to 2C are views for illustrating the structure of a recessed container.

FIG. 2A is a view illustrating the recessed container 2 as viewed from above. The arrow A corresponds to the arrow of FIG. 1A.

On the upper surface of the step portion 18, an end portion of the single through electrode portion 14 is formed, and the collector electrode 13 is formed over almost the entire length of the upper surface of the step portion 18 in the longitudinal direction.

On the other hand, on the upper surface of the step portion 28, end portions of the two through electrode portions 24a and 24b are formed at a predetermined distance, and the collector electrode 23 is formed over almost the entire length of the upper surface of the step portion 28 in the longitudinal direction.

The through electrode portion 14, and the through electrode portion 24a and the through electrode portion 24b pass through the sheet materials 43 and 42 from the upper surfaces of the step portion 18 and the step portion 28, respectively, and reach the upper surface of the sheet material 41.

In this way, the number of the through electrodes is asymmetric between the positive and negative electrodes, which enables a worker to confirm the positive and negative polarities.

Figure 2B:
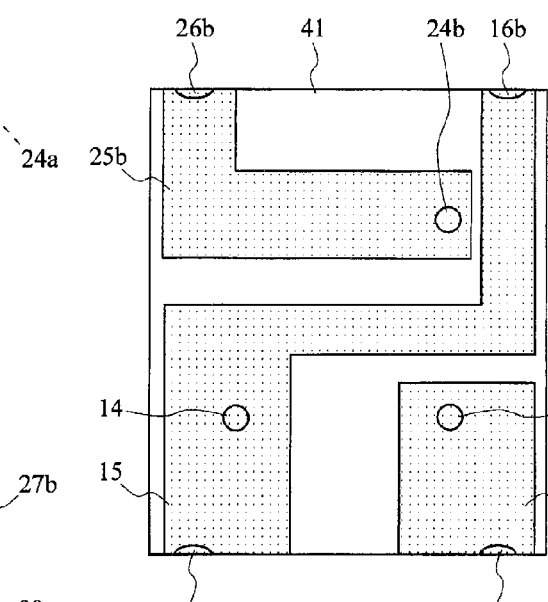

FIG. 2B is a view illustrating the upper surface of the sheet material 41.

The intermediate wiring portion 15 is connected to the lower end of the through electrode portion 14, and is also connected to the side-surface wiring portion 16a, which is formed in the vicinity of one corner part on one diagonal of the sheet material 41 (lower left part of FIG. 2B), and the side-surface wiring portion 16b, which is formed in the vicinity of the other corner part (upper right part of FIG. 2B).

The intermediate wiring portion 25a is connected to the lower end of the through electrode portion 24a, and is also connected to the side-surface wiring portion 26a which is formed in the vicinity of one corner part on the other diagonal of the sheet material 41 (lower right part of FIG. 2B).

The intermediate wiring portion 25b is connected to the lower end of the through electrode portion 24b, and is also connected to the side-surface wiring portion 26b which is formed in the vicinity of the other corner part on the other diagonal of the sheet material 41 (upper left part of FIG. 2B).

In this way, the layout of the intermediate wiring portion 15, the intermediate wiring portion 25a, and the intermediate wiring portion 25b is set so that the vicinities of the corner parts on the one diagonal (side-surface wiring portion 16a and side-surface wiring portion 16b) correspond to negative electrodes while the vicinities of the corner parts on the other diagonal (side-surface wiring portion 26a and side-surface wiring portion 26b) correspond to positive electrodes.

Figure 2C:
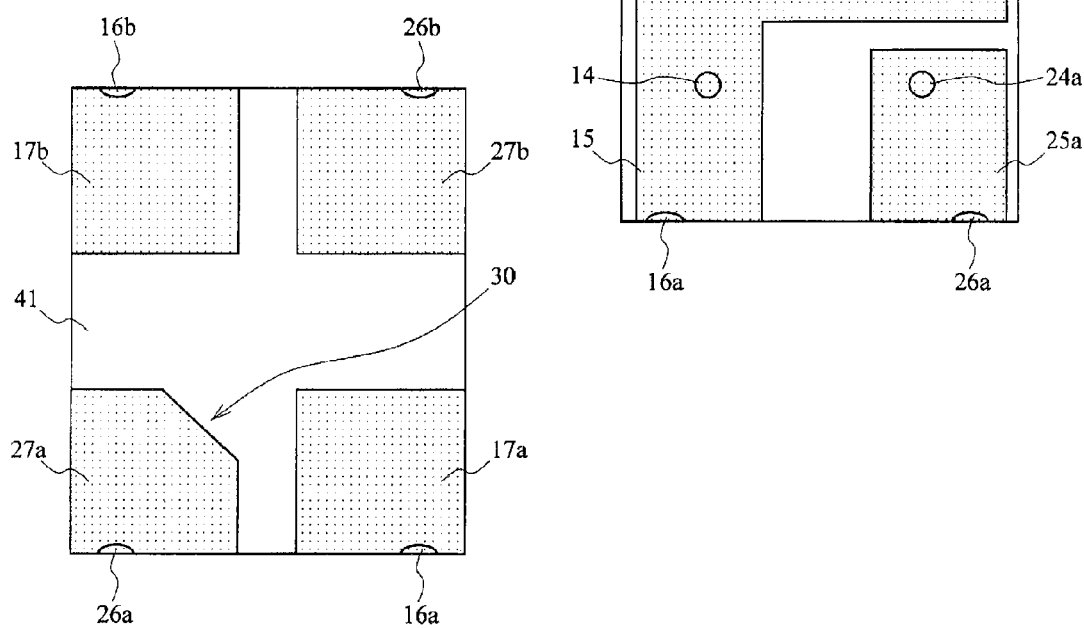

FIG. 2C is a view illustrating the lower surface of the sheet material 41.

FIG. 2C illustrates the sheet material 41 as viewed from below, thus being horizontally reversed from FIG. 2B. The drawings related to the lower surface of the sheet material 41 in the following description are horizontally-reversed views similarly.

On one side on one diagonal of the sheet material 41 (lower right part of FIG. 2C), the external electrode 17a that is connected to the side-surface wiring portion 16a is formed, and on the other side (upper left part of FIG. 2C), the external electrode 17b that is connected to the side-surface wiring portion 16b is formed. Both the external electrode 17a and the external electrode 17b constitute negative electrodes.

On one side on the other diagonal of the sheet material 41 (lower left part of FIG. 2C), the external electrode 27a that is connected to the side-surface wiring portion 26a is formed, and on the other side (upper right part of FIG. 2C), the external electrode 27b that is connected to the side-surface wiring portion 26b is formed. Both the external electrode 27a and the external electrode 27b constitute positive electrodes.

Note that, the external electrode 27a has provided therein a cutout portion 30 for representing the polarity of the electric double-layer capacitor 1.

In this way, on the lower surface of the sheet material 41, that is, on the peripheral bottom surface of the electric double-layer capacitor 1, the corner parts on the one diagonal serve as the negative electrodes (external electrode 17a and external electrode 17b) while the corner parts on the other diagonal serve as the positive electrodes (external electrode 27a and external electrode 27b).

The reason why the four terminals are disposed for the electric double-layer capacitor 1 in this way is as follows.

That is, with the four terminals disposed as described above, the positive electrodes and the negative electrodes can be connected to a board correctly regardless of the direction where the electric double-layer capacitor 1 is mounted on the board, as long as the lateral direction and the longitudinal direction of the electric double-layer capacitor 1 are in the correct directions. Thus, the work of bonding the electric double-layer capacitor 1 onto a board becomes easier.

Further, connection terminals on the board side may be four terminals corresponding to the external electrodes of the electric double-layer capacitor 1, or alternatively at least two terminals may be used as connection terminals while the other terminals may be used as dummy terminals.

The dummy terminal works for stable mounting of the electric double-layer capacitor 1 onto a board and to enhance the bonding strength between the electric double-layer capacitor 1 and the board.

According to this embodiment, the following effects can be obtained.

(1) Various steps, including the placement of the electrode 11 and the electrode 21, can be carried out from above the recessed container 2, which facilitates work to increase productivity and yields.

(2) The step portion 18 and the step portion 28, onto which the electrode 11 and the electrode 21 are to be placed respectively, are formed at the same height in the middle of the recessed portion 10. Therefore, when the electrode 11 and the electrode 21 are to be placed, there is no need to carry out individual height adjustments of the assembly apparatus, which improves workability and yields.

(3) The negative electrode and the positive electrode are bonded to each other inside the recessed portion 10, and hence no voltage is applied to the sealing plate 3, which can prevent the sealing plate 3 from dissolving, thus improving yields.

(4) The recessed container 2 is formed by laminating the sheet materials 41 to 44, which facilitates the formation of the recessed portion 10, the step portion 18, and the step portion 28 and also facilitates the formation of the collector electrode 13, the collector electrode 23, the through electrode portion 14, the through electrode portion 24, the intermediate wiring portion 15, and the intermediate wiring portion 25.

(5) The sealing plate 3 is not used as a current path as in the conventional example, which increases the degree of freedom of design, such as omitting the sealing ring 6 and replacing the sealing plate 3 with the one made of ceramics.

(6) The collector electrode 13 and the collector electrode 23 are bonded onto the step portions provided in the middle of the recessed portion 10, which reduces a stress to be applied to a thick conductor such as the collector electrode 13 and the collector electrode 23, thus preventing winding deviation. Further, the electrode 11 and the collector 12, and the electrode 21 and the collector 22 can be accommodated in the recessed container 2 with a reduced stress applied thereto.

(7) The intermediate wiring portion 15, the intermediate wiring portion 25a, and the intermediate wiring portion 25b are formed inside the main body of the recessed container 2 with an appropriate layout, which can realize a complicated disposition of the external electrodes.

(8) The external electrode 17a and the external electrode 17b are disposed on one diagonal of the bottom surface of the electric double-layer capacitor 1 while the external electrode 27a and the external electrode 27b are disposed on the other diagonal to provide four terminals, which gives no right and left distinctions, thus facilitating setting of the direction of electrodes when the electric double-layer capacitor 1 is surface-mounted onto a board.

(9) The polarity can be represented by asymmetric shapes of the external electrodes or the like.

(10) By forming the step portion 18 and the step portion 28 in the longitudinal direction, the strength of a package can be enhanced. This prevents the occurrence of cracks in a package or damage thereto due to an external force that is applied during sealing, thus improving yields.

First Modified Example

Figure 3:
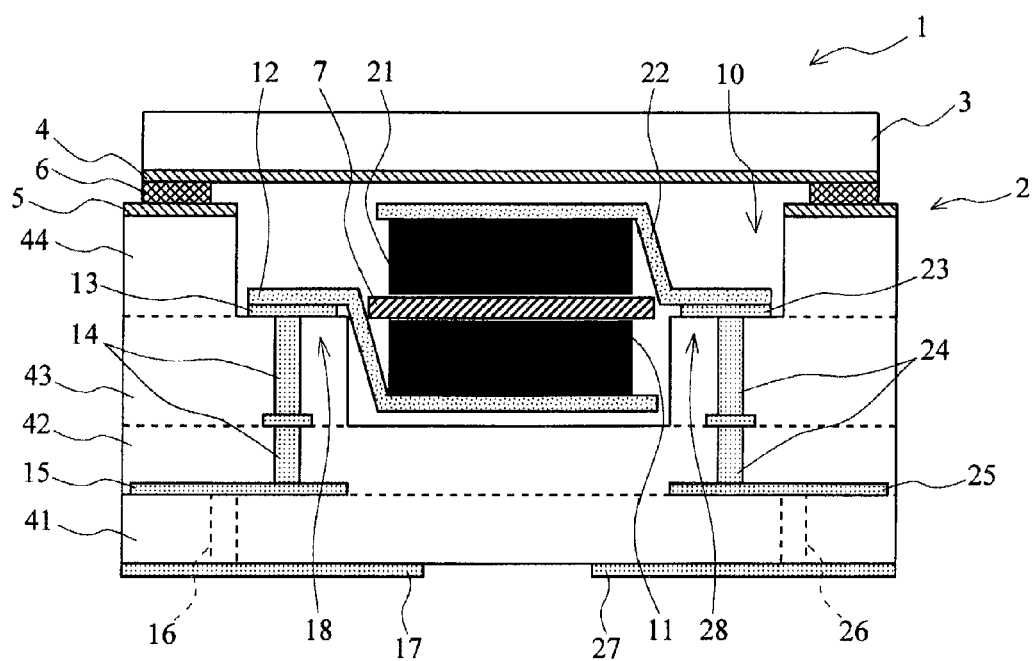
FIG. 3 is a cross-sectional view of an electric double-layer capacitor according to a first modified example of the present invention.

FIG. 3 is a side cross-sectional view of an electric double-layer capacitor 1 in the lateral direction according to a first modified example of the present invention.

In the first modified example, the electrode 11 is provided as a lower electrode while the electrode 21 is provided as an upper electrode, and both the electrodes are overlapped and opposed to each other in the depth direction of the electric double-layer capacitor 1. The electrode 11 and the electrode 21 are formed by cutting a sheet material.

The separator 7 is placed between the electrode 11 and the electrode 21 to prevent short-circuit between the electrode 11 and the electrode 21 due to contact.

One side of the collector 12 is bonded onto the upper end surface of the collector electrode 13, and the other side thereof is curved toward the bottom part of the recessed portion 10 and bonded to the lower side of the electrode 11.

One side of the collector 22 is bonded onto the upper end surface of the collector electrode 23, and the other side thereof is curved toward the sealing plate 3 and bonded to the upper side of the electrode 21.

Other structures are the same as those in the above-mentioned embodiment.

Second Modified Example

Figure 4:
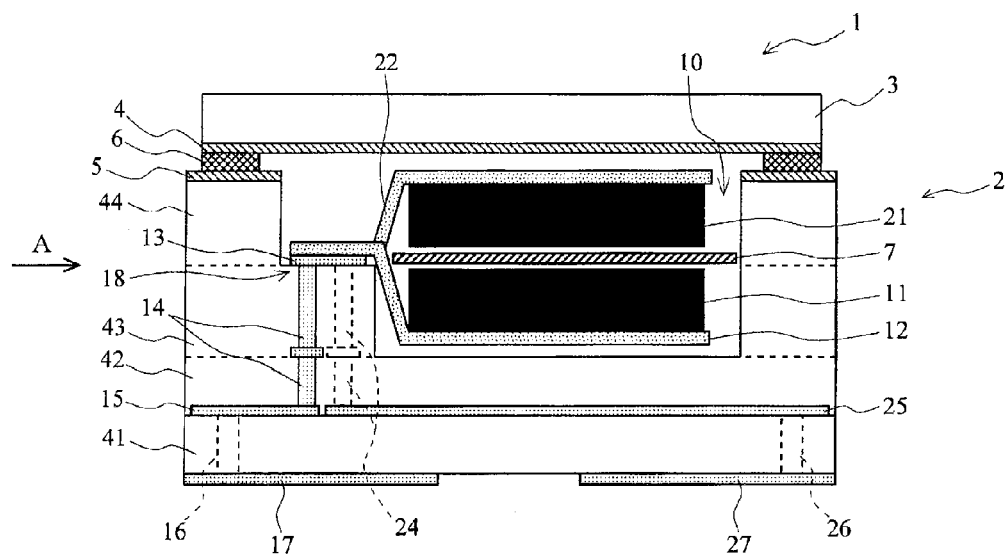
FIGS. 4A and 4B are cross-sectional views of electric double-layer capacitors according to a second modified example of the present invention.
FIG. 4C is a top view of an electrode portion of FIG. 4B.
Figure 4:
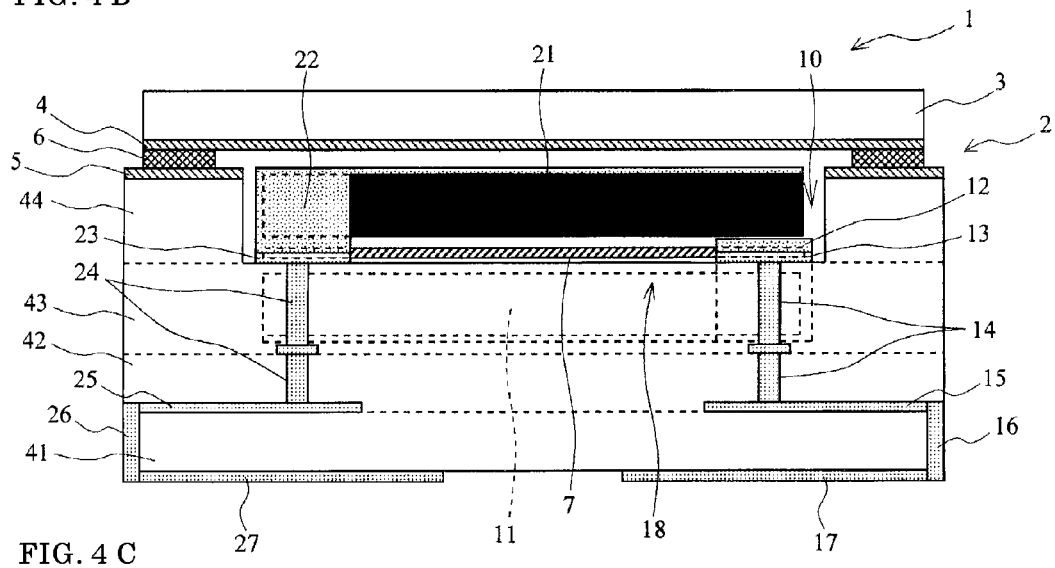
Figure 4:
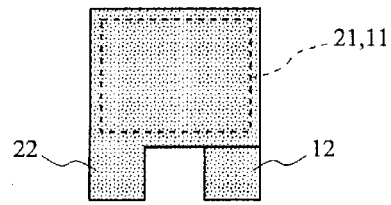

FIG. 4A is a side cross-sectional view of an electric double-layer capacitor 1 in the lateral direction according to a second modified example of the present invention.

The second modified example is an example in which the electrode 11 and the electrode 21 are connected to a single step portion 18.

In the second modified example, similarly to the first modified example, the electrode 11 is provided as a lower electrode while the electrode 21 is provided as an upper electrode, and both the electrodes are overlapped and opposed to each other in the thickness direction of the electric double-layer capacitor 1, with the separator 7 placed therebetween.

The collector 12 has a tab formed on one side of the step portion 18 in the longitudinal direction (front side of the figure) and bonded onto the upper surface of the collector electrode 13. The other side of the collector 12 is curved toward the bottom part of the recessed portion 10 and bonded to the lower side of the electrode 11.

The collector 22 has a tab formed on the other side of the step portion 18 in the longitudinal direction (rear side of the figure) and bonded onto the upper surface of the collector electrode 23 (not shown). The other side of the collector 22 is curved toward the sealing plate 3 and bonded to the upper side of the electrode 21.

In this modified example, the through electrode portion 24 is formed on the step portion 18 side.

Note that, the through electrode portion 24 is present behind the through electrode portion 14 and hence should not be illustrated, but in FIG. 4A, the through electrode portion 14 is offset toward the recessed portion 10 and the through electrode portion 24 is illustrated by broken lines. The same holds true for the respective modified examples described below in which the through electrode portion 14 and the through electrode portion 24 are formed on the step portion 18 side.

FIG. 4B is a cross-sectional view of the electric double-layer capacitor 1 in the longitudinal direction according to the second modified example as viewed in the direction of the arrow A of FIG. 4A.

As illustrated in FIG. 4B, the collector electrode 13 is formed on one side of the step portion 18, and is electrically connected to the external electrode 17 via the through electrode portion 14, the intermediate wiring portion 15, and the side surface wiring portion 16.

Then, a corner part of the collector 12 on one side (side on which the collector electrode 13 is formed) is bonded onto the collector electrode 13, and the collector 12 expands on the bottom surface of the recessed portion 10 to be bonded onto the entire lower surface of the electrode 11.

The collector electrode 23 is formed on the other side of the step portion 18, and is electrically connected to the external electrode 27 via the through electrode portion 24, the intermediate wiring portion 25, and the side surface wiring portion 26.

Then, a corner part of the collector 22 on the other side (side on which the collector electrode 23 is formed) is bonded onto the collector electrode 23, and the collector 22 expands on the sealing plate 3 side of the recessed portion 10 to be bonded onto the entire upper surface of the electrode 21.

FIG. 4C is a view illustrating an electrode portion of FIG. 4B as viewed from above. Note that, the scale of illustration is reduced.

As illustrated in FIG. 4C, the collector 22 is formed into a substantially rectangular shape, and a tab to be bonded onto the collector electrode 23 is formed on one side of the side on the step portion 18 side.

Similarly, the collector 12 is also formed into a substantially rectangular shape, and a tab to be bonded onto the collector electrode 13 is formed on the other side of the side on the step portion 18 side.

In this way, in the second modified example, the recessed portion 10 includes the single step portion 18, and the collector electrode 13 and the collector electrode 23 are placed on the step portion 18 as being shifted from each other in the longitudinal direction of the step portion 18.

Then, by fixing the collector 12 and the collector 22 onto the collector electrode 13 and the collector electrode 23, respectively, the electrode 11 and the electrode 21 are both fixed onto the step portion 18.

Other structures are the same as those in the embodiment.

As described above, the collector 12 and the collector 22 are placed on the same side, that is, on one side of the recessed portion 10, which improves the workability.

Figure 5:
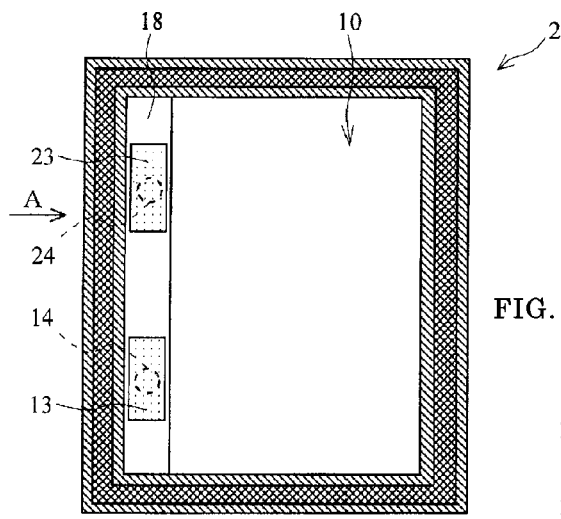
FIGS. 5A to 5C are views for illustrating the structure of a recessed container according to the second modified example of the present invention.
Figure 5:
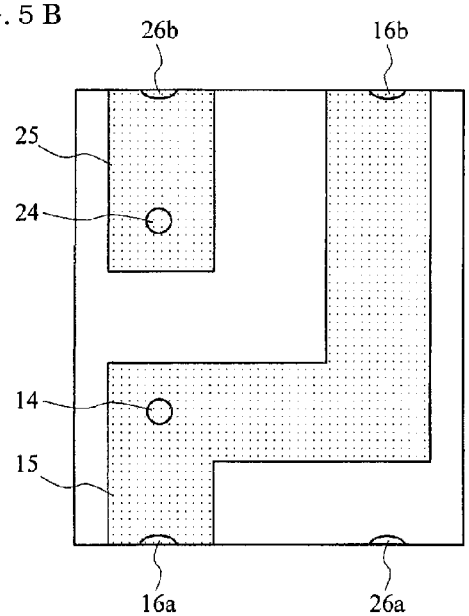
Figure 5:
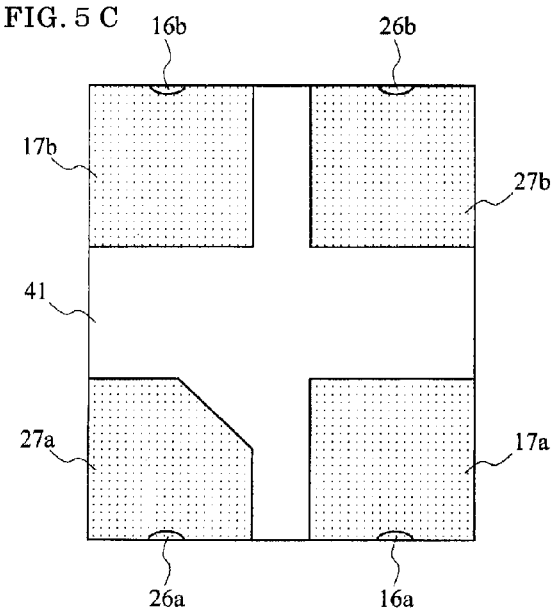

FIG. 5A is a view illustrating the recessed container 2 according to the second modified example as viewed from above. The arrow A corresponds to the arrow of FIG. 4A.

The through electrode portion 14 is formed on one side of the step portion 18 in the longitudinal direction, and the collector electrode 13 is formed thereon.

Further, the through electrode portion 24 is formed on the other side of the step portion 18 in the longitudinal direction, and the collector electrode 23 is formed thereon.

In this way, on the upper surface of the step portion 18, the collector electrode 13 and the collector electrode 23 are formed at a distance and thus insulated from each other.

Each of the through electrode portion 14 and the through electrode portion 24 passes through the sheet materials 43 and 42 from the upper surface of the step portion 18 and reaches the upper surface of the sheet material 41.

FIG. 5B is a view illustrating the upper surface of the sheet material 41.

The intermediate wiring portion 15 is connected to the lower end of the through electrode portion 14, and is also connected to the side-surface wiring portion 16a, which is formed in the vicinity of one corner part on one diagonal of the sheet material 41 (lower left part of FIG. 5B), and the side-surface wiring portion 16b, which is formed in the vicinity of the other corner part (upper right part of FIG. 5B).

The intermediate wiring portion 25 is connected to the lower end of the through electrode portion 24, and is also connected to the side-surface wiring portion 26b, which is formed in the vicinity of one corner part on the other diagonal of the sheet material 41 (upper left part of FIG. 5B). The side-surface wiring portion 26a formed in the vicinity of the other corner part (lower left part of FIG. 5B) is not connected to either electrode and serves as dummy wiring.

FIG. 5C is a view illustrating the lower surface of the sheet material 41.

In the vicinity of one corner part on one diagonal of the sheet material 41 (lower right part of FIG. 5C), the external electrode 17a that is connected to the side-surface wiring portion 16a is formed, and in the vicinity of the other corner part (upper left part of FIG. 5C), the external electrode 17b that is connected to the side-surface wiring portion 16b is formed. Both the external electrodes 17a and 17b constitute negative electrodes.

On the other hand, in the vicinity of one corner part on the other diagonal of the sheet material 41 (lower left part of FIG. 5C), the external electrode 27a that is connected to the side-surface wiring portion 26a is formed, and in the vicinity of the other corner part (upper right part of FIG. 5C), the external electrode 27b that is connected to the side-surface wiring portion 26b is formed.

The external electrode 27a constitutes a dummy external electrode, and the external electrode 27b constitutes a positive electrode.

The external electrode 27a has no function as an electrode but functions to allow for stable mounting of the electric double-layer capacitor 1 onto a board and improve the bonding strength of the electric double-layer capacitor 1.

Third Modified Example

This modified example is an example in which the electrode 11 and the electrode 21 are placed in the same manner as that of the second modified example but the external electrodes are two terminals.

Figure 6:
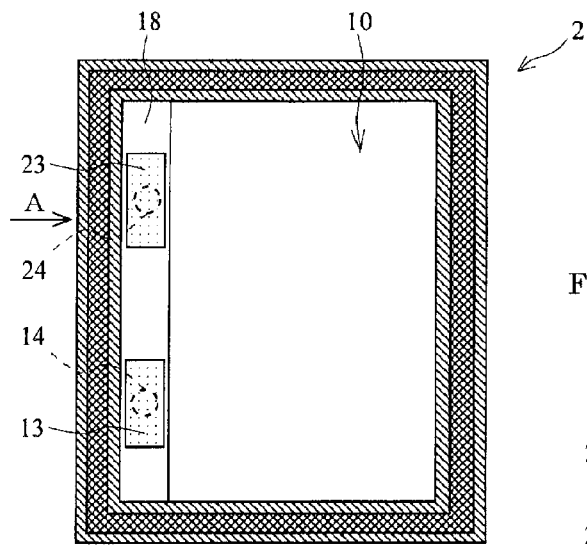
FIGS. 6A to 6C are views for illustrating the structure of a recessed container according to a third modified example of the present invention.
Figure 6:
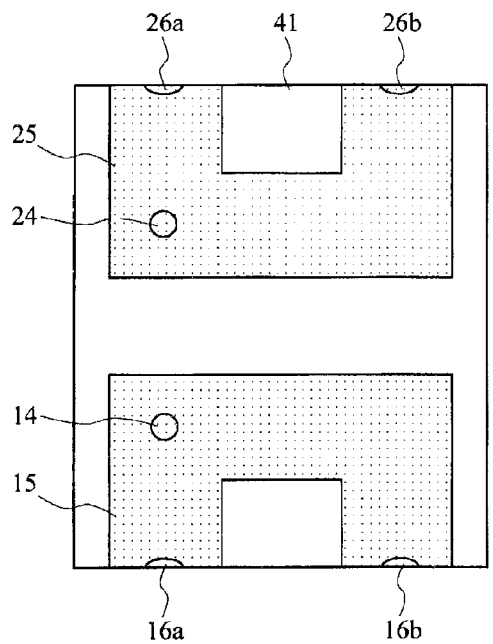
Figure 6:
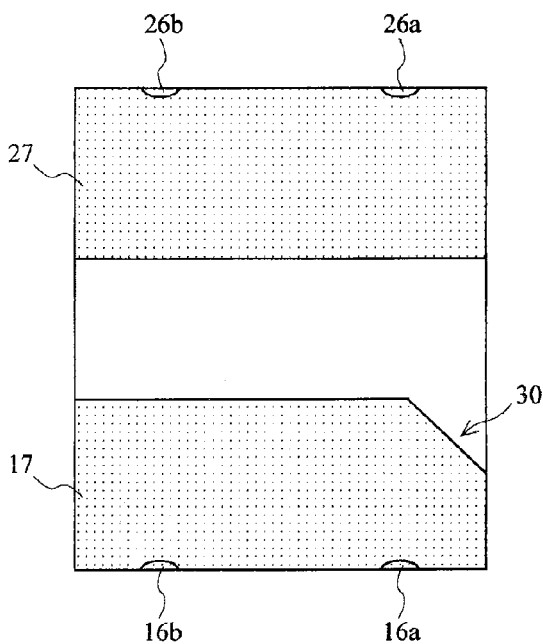

FIG. 6A is a view illustrating the recessed container 2 according to the third modified example as viewed from above, which is the same as the second modified example. The arrow A corresponds to the arrow of FIG. 4A.

FIG. 6B is a view illustrating the upper surface of the sheet material 41.

The intermediate wiring portion 15 is connected to the lower end of the through electrode portion 14, and is also connected to the side-surface wiring portion 16a and the side-surface wiring portion 16b which are formed on the right and left on one side of the sheet material 41.

The intermediate wiring portion 25 is connected to the lower end of the through electrode portion 24, and is also connected to the side-surface wiring portion 26a and the side-surface wiring portion 26b which are formed on the right and left on the other side of the sheet material 41.

FIG. 6C is a view illustrating the lower surface of the sheet material 41.

On the one side of the sheet material 41, the external electrode 17 that is connected to the side-surface wiring portion 16a and the side-surface wiring portion 16b is formed on the entire end portion. On the other side of the sheet material 41, the external electrode 27 that is connected to the side-surface wiring portion 26a and the side-surface wiring portion 26b is formed on the entire end portion.

The external electrode 17 serves as a negative electrode, and the external electrode 27 serves as a positive electrode. Further, the external electrode 17 has formed therein the cutout portion 30 for representing the polarity.

In this way, the two-terminal electric double-layer capacitor 1 may also be obtained.

Fourth Modified Example

This modified example is another example in which the electrode 11 and the electrode 21 are placed in the same manner as that of the second modified example but the external electrodes are two terminals.

Figure 7:
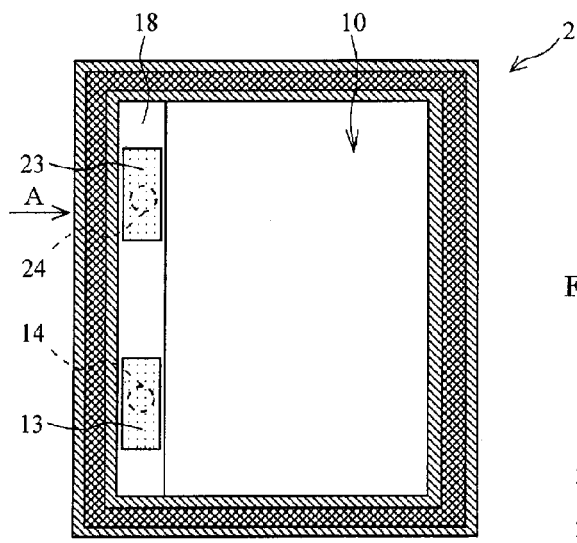
FIGS. 7A to 7C are views for illustrating the structure of a recessed container according to a fourth modified example of the present invention.
Figure 7:
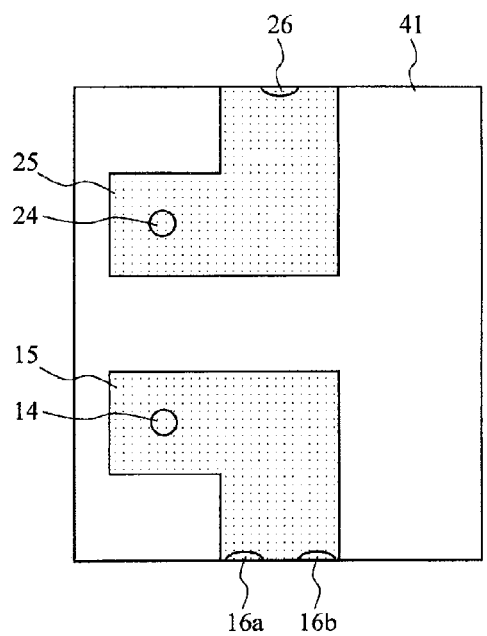
Figure 7:
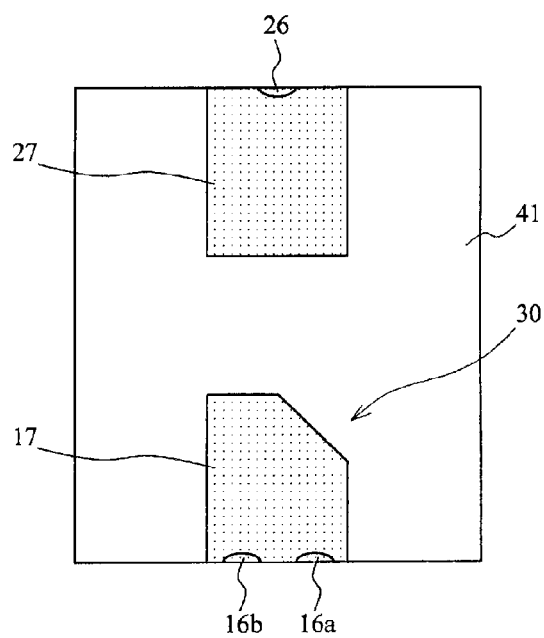

FIG. 7A is a view illustrating the recessed container 2 according to the fourth modified example as viewed from above, which is the same as the second modified example. The arrow A corresponds to the arrow of FIG. 4A.

FIG. 7B is a view illustrating the upper surface of the sheet material 41.

The intermediate wiring portion 15 is connected to the lower end of the through electrode portion 14, and is also connected to the side-surface wiring portion 16*a* and the side-surface wiring portion 16*b*, which are formed in the vicinity of the center of one end portion of the sheet material 41 so as to be close to each other.

The intermediate wiring portion 25 is connected to the lower end of the through electrode portion 24, and is also connected to the side-surface wiring portion 26 which is formed in the vicinity of the center of the other end portion of the sheet material 41.

Here, the two side-surface wiring portions 16*a* and 16*b* are provided for the single side-surface wiring portion 26 in order to make it possible to confirm the polarity from the side surface of the electric double-layer capacitor 1.

FIG. 7C is a view illustrating the lower surface of the sheet material 41.

On one side of the sheet material 41, the external electrode 17 that is connected to the side-surface wiring portion 16*a* and the side-surface wiring portion 16*b* is formed to have a predetermined width at the center of the end portion. On the other side of the sheet material 41, the external electrode 27 that is connected to the side-surface wiring portion 26 is formed to have the same predetermined width at the center of the end portion.

The external electrode 17 serves as a negative electrode, and the external electrode 27 serves as a positive electrode. Further, the external electrode 17 has formed therein the cutout portion 30 for representing the polarity.

FIGS. 8A to 8E are views for illustrating other modified examples in which the external electrodes are two terminals.

Figure 8:
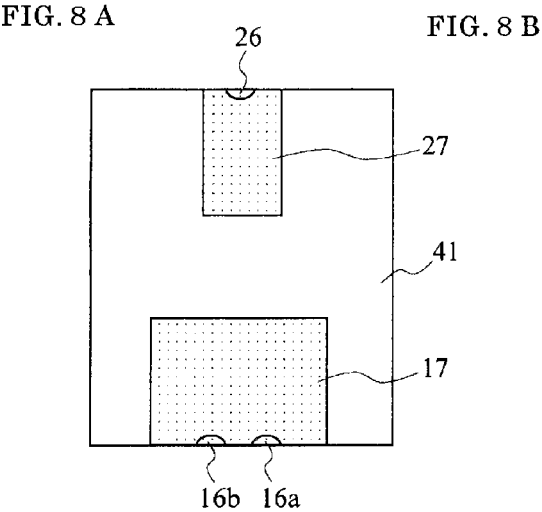
FIGS. 8A to 8E are views for illustrating other modified examples of two-terminal external electrodes.
Figure 8:
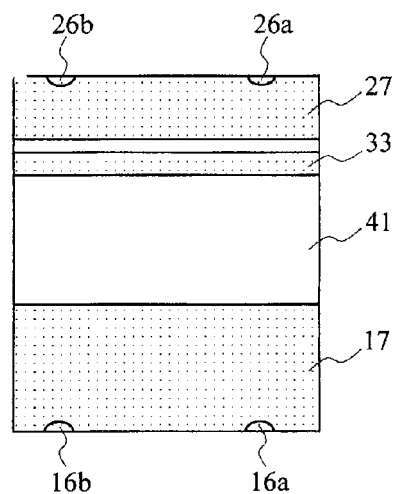
Figure 8:
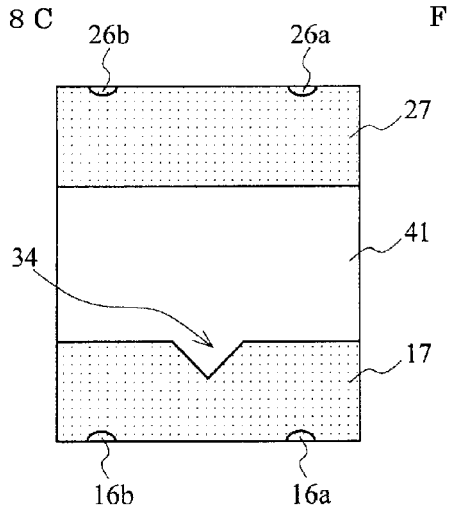
Figure 8:
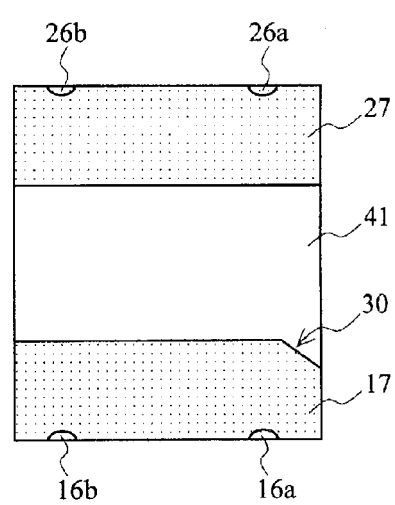
Figure 8:
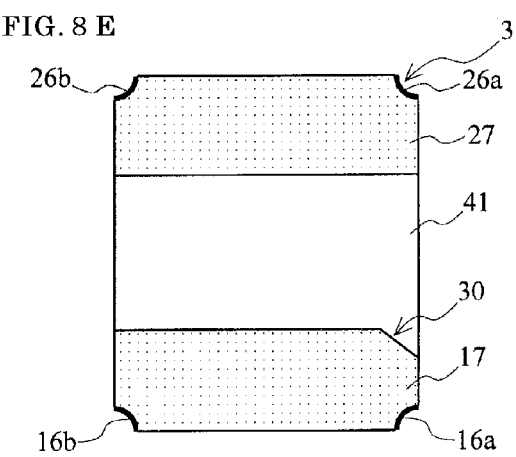

FIG. 8A is an example in which the width of the external electrode 17 is made larger than the width of the external electrode 27 to represent the polarity of the external electrode. Such asymmetric shapes of the external electrode 17 and the external electrode 27 can represent the polarity.

FIG. 8B is an example in which the external electrode 17 is formed on the entire end portion on one side of the lower surface of the sheet material 41 while the external electrode 27 is formed on the entire end portion on the other side, and further a stripe-shaped metallic layer 33 is formed in close to the external electrode 27 to represent the polarity of the external electrode.

FIG. 8C is an example in which the external electrode 17 is formed on the entire end portion on one side of the lower surface of the sheet material 41 while the external electrode 27 is formed on the entire end portion on the other side, and a triangular-shaped notch portion 34 is provided at the center part of the external electrode 17 to represent the polarity of the external electrode.

FIG. 8D is an example in which the external electrode 17 is formed on the entire end portion on one side of the lower surface of the sheet material 41 while the external electrode 27 is formed on the entire end portion on the other side, and the cutout portion 30 is provided in the external electrode 17 to represent the polarity of the external electrode.

FIG. 8E is an example in which a quarter-circle-shaped portion 36, which is a quarter-circle-shaped groove, is formed at each of the four corners of the sheet material 41, and the side-surface wiring portion 16*a*, the side-surface wiring portion 16*b*, the side-surface wiring portion 26*a*, and the side-surface wiring portion 26*b* are formed on the quarter-circle-shaped portions 36, respectively.

In this way, the side-surface wiring portion 16*a*, the side-surface wiring portion 16*b*, the side-surface wiring portion 26*a*, and the side-surface wiring portion 26*b* may be formed at the corner parts of the sheet material 41.

Each of the four corners of the sheet material 41 has the quarter-circle shape and the metallic layer formed as the side-surface wiring portion is formed on the quarter-circle shape. Therefore, the corner parts of the sheet material 41 can be prevented from being chipped.

Further, the external electrode 17 has formed therein the cutout portion 30 for representing the polarity.

Fifth Modified Example

Figure 9:
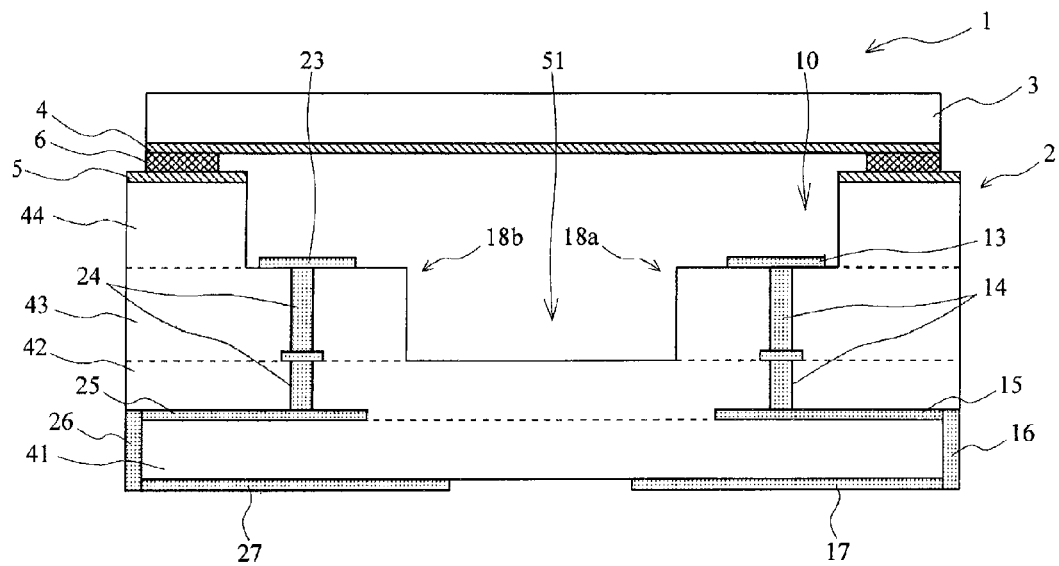
FIGS. 9A and 9B are a cross-sectional view and a top view of an electric double-layer capacitor according to a fifth modified example of the present invention.
Figure 9:
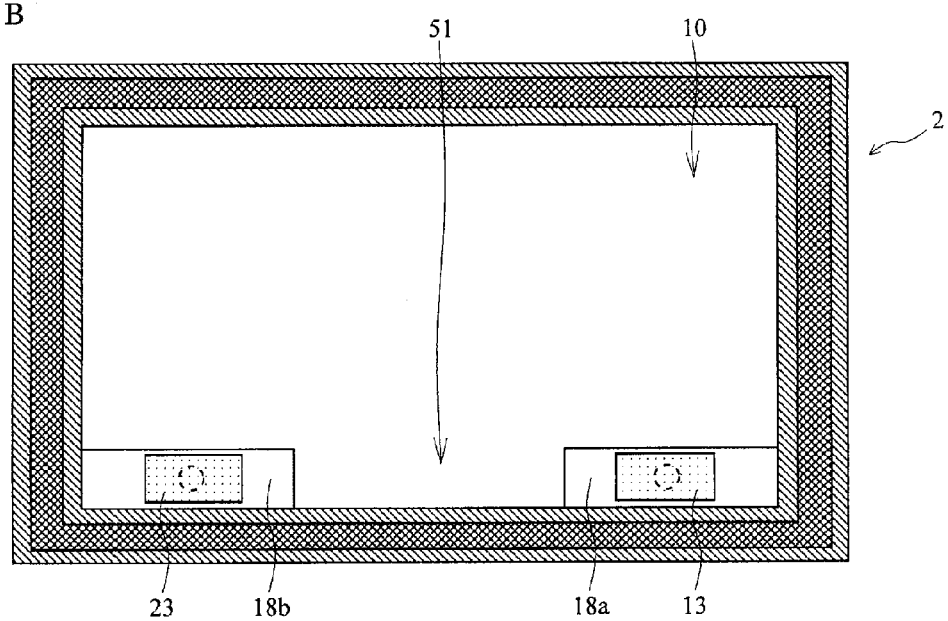

FIG. 9A is a side cross-sectional view of an electric double-layer capacitor 1 in the longitudinal direction according to a fifth modified example of the present invention.

The electric double-layer capacitor 1 according to this modified example is a further modification of the second modified example, and FIG. 9A corresponds to FIG. 4B. Note that, to avoid complication of the figure, the electrode 11, the electrode 21, the collector 12, the collector 22, and the separator 7 are not illustrated.

In the second modified example, the collector electrode 13 and the collector electrode 23 are formed on the single step portion 18, but this modified example is different in that step portions 18*a* and 18*b* corresponding to the collector electrode 13 and the collector electrode 23 are formed across a gap portion 51.

That is, this modified example is an example in which, in the second modified example, the gap portion 51 is provided at the center part of the step portion 18 and the step portion 18 is cut into the step portion 18*a* and the step portion 18*b*. Other structures are the same as those of the second modified example.

In this way, by providing the gap portion 51 between the step portions 18*a* and 18*b*, it is possible to prevent short-circuit between the negative electrode and the positive electrode, which occurs when conductive adhesives used for bonding the collector 12 and the collector 22 respectively onto the collector electrode 13 and the collector electrode 23 spread off and contact each other.

FIG. 9B is a view illustrating the recessed container 2 according to the fifth modified example as viewed from above. As illustrated in FIG. 9B, the individual step portions 18*a* and 18*b* are formed corresponding to the collector electrodes 13 and 23, respectively.

Sixth Modified Example

Figure 10:
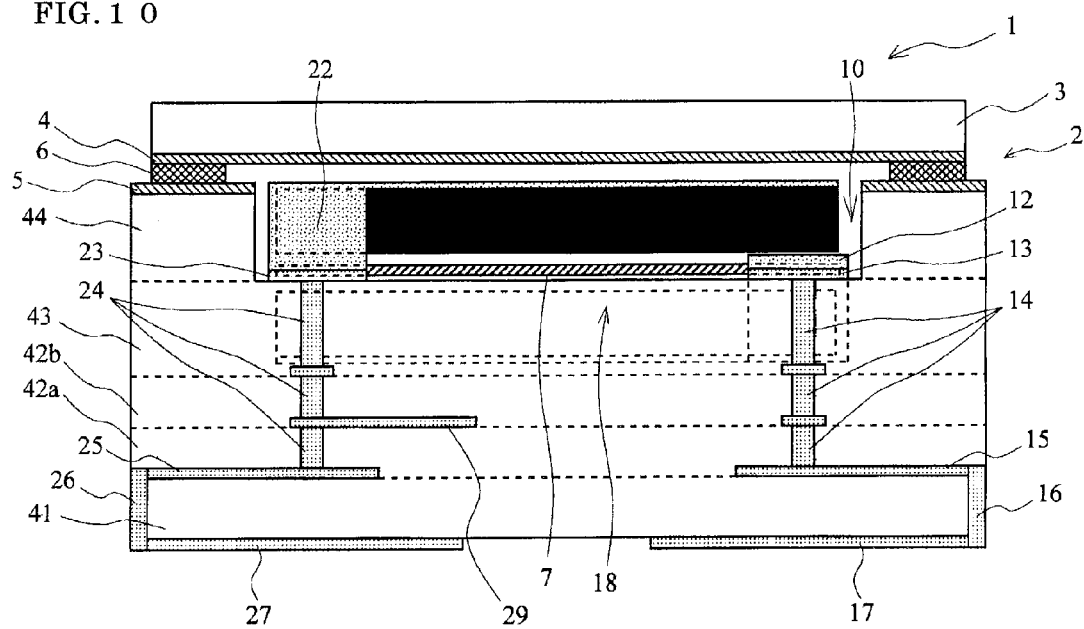
FIG. 10 is a cross-sectional view of an electric double-layer capacitor according to a sixth modified example of the present invention.

FIG. 10 is a side cross-sectional view of an electric double-layer capacitor 1 in the longitudinal direction according to a sixth modified example of the present invention.

The electric double-layer capacitor 1 according to this modified example is a further modification of the second modified example, and FIG. 10 corresponds to FIG. 4B.

In the sixth modified example, the sheet material 42 of the second modified example is replaced with two layers of a sheet material 42*a* and a sheet material 42*b*, and an intermediate wiring portion 29 is formed on the surface of the sheet material 42*a*.

By increasing the number of the wiring layers, more complicated wiring layout is attained within the main body of the recessed container 2.

Figure 11A:
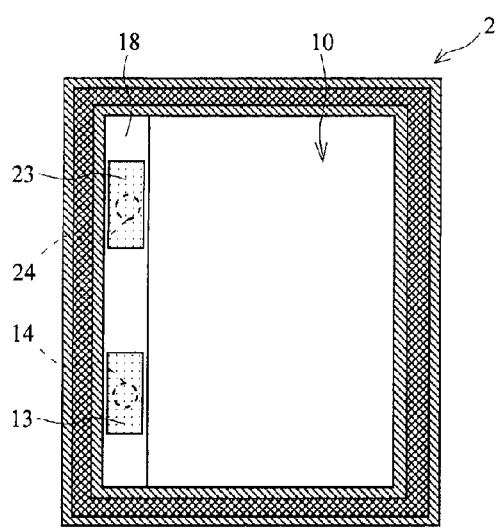
FIGS. 11A to 11D are views for illustrating the structure of a recessed container according to the sixth modified example of the present invention.

FIG. 11A is a view illustrating the recessed container 2 according to the sixth modified example as viewed from above, which is the same as the second modified example.

Figure 11B:
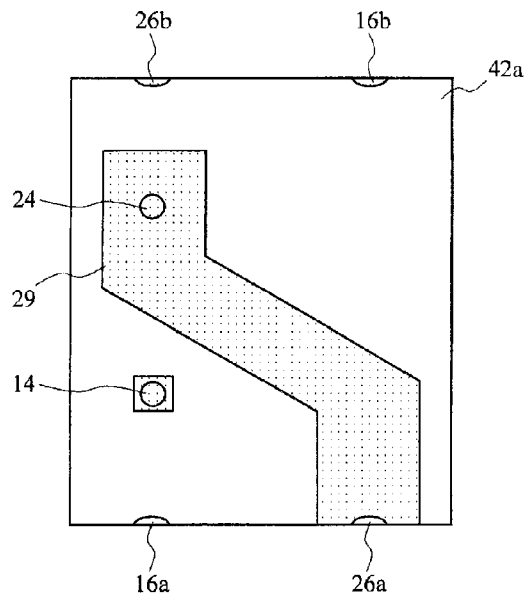

FIG. 11B is a view illustrating an upper surface of the sheet material 42*a*.

The intermediate wiring portion 29 has the through electrode portion 24 passing therethrough and is connected to the through electrode portion 24, and is also connected to the side-surface wiring portion 26*a* which is provided in the vicinity of one corner part of one diagonal of the sheet material 42a (lower right part of FIG. 11B).

Further, the through electrode portion 14 passes through the sheet material 42a via a rectangular intermediate electrode.

Figure 11C:
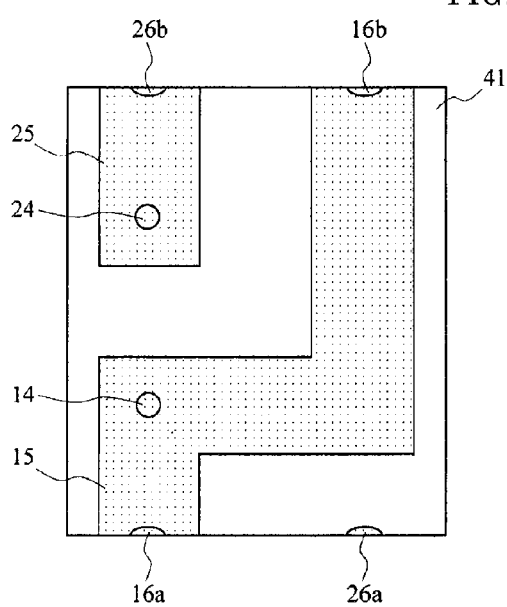

FIG. 11C is a view illustrating the upper surface of the sheet material 41.

The intermediate wiring portion 25 is connected to the lower end of the through electrode portion 24, and is also connected to the side-surface wiring portion 26b which is formed in the vicinity of the other corner part of one diagonal of the sheet material 41 (upper left part of FIG. 11C).

The intermediate wiring portion 15 is connected to the lower end of the through electrode portion 14, and is also connected to the side-surface wiring portion 16a, which is formed in the vicinity of one corner of the other diagonal of the sheet material 41 (lower left part of FIG. 11C), and the side-surface wiring portion 16b, which is formed in the vicinity of the other corner part of the sheet material 41 (upper right part of FIG. 11C).

Figure 11D:
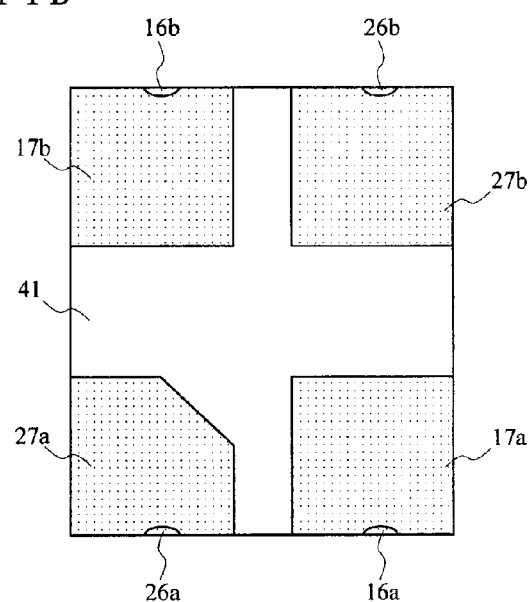

FIG. 11D is a view illustrating the lower surface of the sheet material 41.

At the lower right part of the sheet material 41, the external electrode 17a that is connected to the side-surface wiring portion 16a is formed, and at the upper left part, the external electrode 17b that is connected to the side-surface wiring portion 16b is formed. Both the external electrodes 17a and 17b constitute negative electrodes.

On the other hand, at the lower left part of the sheet material 41, the external electrode 27a that is connected to the side-surface wiring portion 26a is formed, and at the upper right part, the external electrode 27b that is connected to the side-surface wiring portion 26b is foamed. Both the external electrodes 27a and 27b constitute positive electrodes.

In the second modified example, the external electrode 27a is a dummy electrode, but in the sixth modified example, the external electrode 27a functions as an electrode via the intermediate wiring portion 29.

In this way, in the sixth modified example, by increasing the number of the intermediate wiring layers, both the electrode 11 and the electrode 21 can be fixed onto the step portion 18, and on the bottom surface of the electric double-layer capacitor 1, the corner part on one diagonal can serve as a negative external electrode while the corner part on the other diagonal can serve as a positive external electrode.

Seventh Modified Example

Figure 12:
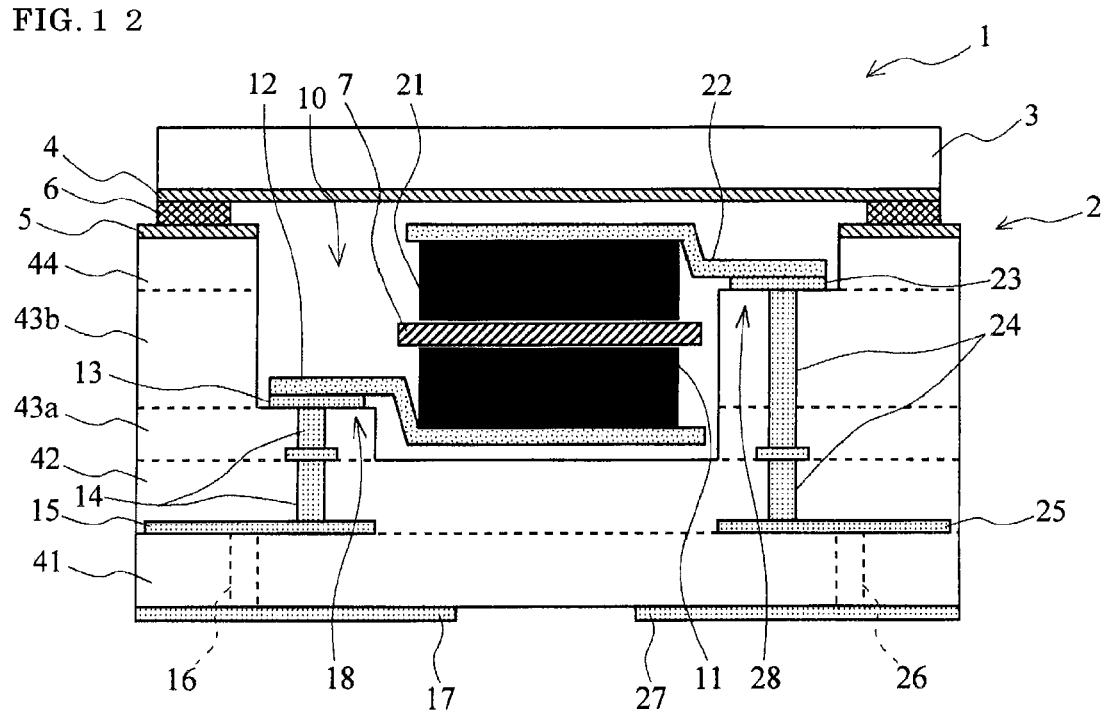
FIG. 12 is a cross-sectional view of an electric double-layer capacitor according to a seventh modified example of the present invention.

FIG. 12 is a side cross-sectional view of an electric double-layer capacitor 1 according to a seventh modified example of the present invention in the lateral direction.

This modified example is an example in which, in the middle of the recessed portion 10, the step portion 18 and the step portion 28 are formed at different heights.

In the recessed container 2, sheet materials 43a and 43b are laminated on the upper surface of the sheet material 42, and the sheet material 44 is laminated thereon. Other structures are the same as those in the first modified example.

The step portion 18 is formed on an upper surface of the sheet material 43a, and the through electrode portion 14 passes through the sheet material 43a and the sheet material 42 and is connected to the intermediate wiring portion 15.

The step portion 28 is formed on an upper surface of the sheet material 43b, and the through electrode portion 24 passes through the sheet material 43b the sheet material 43a, and the sheet material 42 and is connected to the intermediate wiring portion 25.

The collector electrode 23 is formed at a position higher than the collector electrode 13 by the thickness of the sheet material 43b.

In this way, it is also possible to form the step portion 18 and the step portion 28 at different heights, and in this case, a stress to be applied to the collector 12 and the collector 22 and a stress to be applied to the electrode 11 and the electrode 21 can be reduced more.

As a method for establishing electrical connection from the collector 12, the collector electrode 13, the through electrode portion 14, and the intermediate wiring portion 15 to the external electrode 17, a method of establishing the connection by providing an inner through electrode in the sheet material 41 is also selectable, in addition to the method of establishing the connection by providing the side surface wiring portion 16 outside the sheet material 41.

Similarly, as a method for establishing electrical connection from the collector 22, the collector electrode 23, the through electrode portion 24, and the intermediate wiring portion 25 to the external electrode 27, a method of establishing the connection by providing an inner through electrode in the sheet material 41 is also selectable, in addition to the method of establishing the connection by providing the side surface wiring portion 26 outside the sheet material 41.

Eighth Modified Example

Figure 13A:
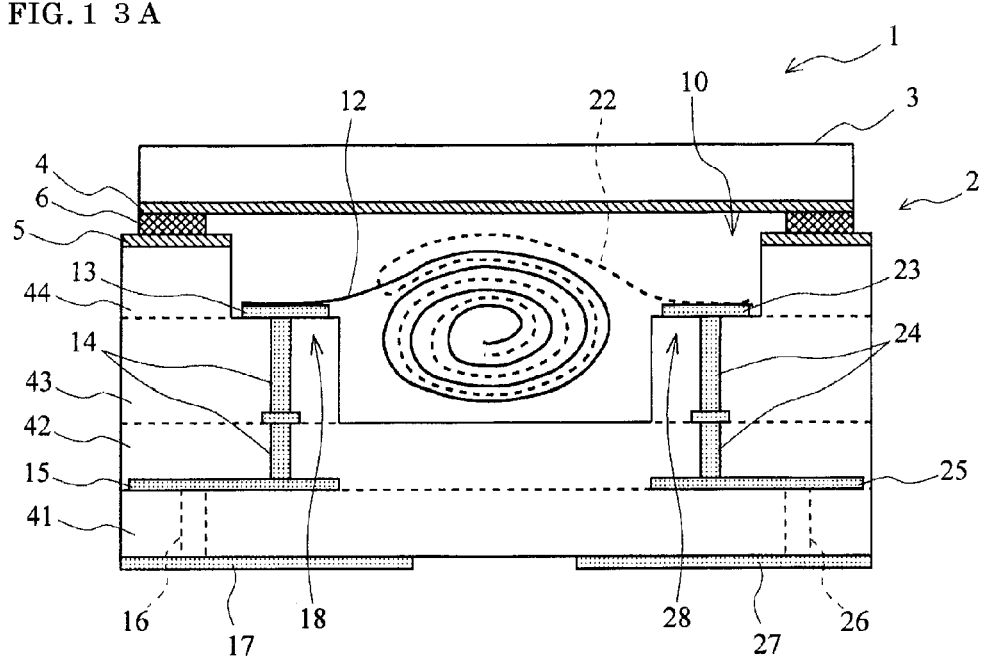
FIGS. 13A and 13B are cross-sectional views of electric double-layer capacitors according to an eighth modified example of the present invention.

FIG. 13A is a side cross-sectional view of an electric double-layer capacitor 1 according to an eighth modified example according to the present invention in the lateral direction.

Other structures than the electrode 11, the electrode 21, the collector 12, the collector 22, and the separator 7 are the same as those in the embodiment, and FIG. 13A corresponds to FIG. 1A.

To avoid complication of the figure, the electrode 11, the electrode 21, and the separator 7 are not illustrated.

An electrode portion of the electric double-layer capacitor 1 according to the eighth modified example is constituted by rolling the sheet-shaped electrode 11 formed on the collector 12 and the sheet-shaped electrode 21 formed on the collector 22 together with the sheet-shaped separator 7.

More specifically, the sheet-shaped electrode 11 formed on the lower surface of the collector 12 and the sheet-shaped electrode 21 foamed on the upper surface of the collector 22 are opposed to each other while sandwiching the sheet-shaped separator 7, and the electrode 11, the electrode 21, the collector 12, the collector 22, and the separator 7 are rolled together, to thereby form the electrode portion.

Tabs are formed at the end portions of the collector 12 and the collector 22 and bonded onto the collector electrode 13 and the collector electrode 23, respectively. FIG. 13C illustrates a view of the electrode portion as viewed from above.

In this way, the electrode 11 and the electrode 21 are rolled into a roll, which increases the opposing area of the electrode 11 and the electrode 21 with a small space. This increases the amount of current per unit area of the electrode, resulting in excellent instantaneous discharge characteristics (pulse discharge characteristics) and rapid charge characteristics.

Although FIG. 13A exemplifies the structure of the electric double-layer capacitor provided in the container, the same structure is also applicable to a battery, a lithium-ion battery, or a lithium-ion capacitor.

Figure 13B:
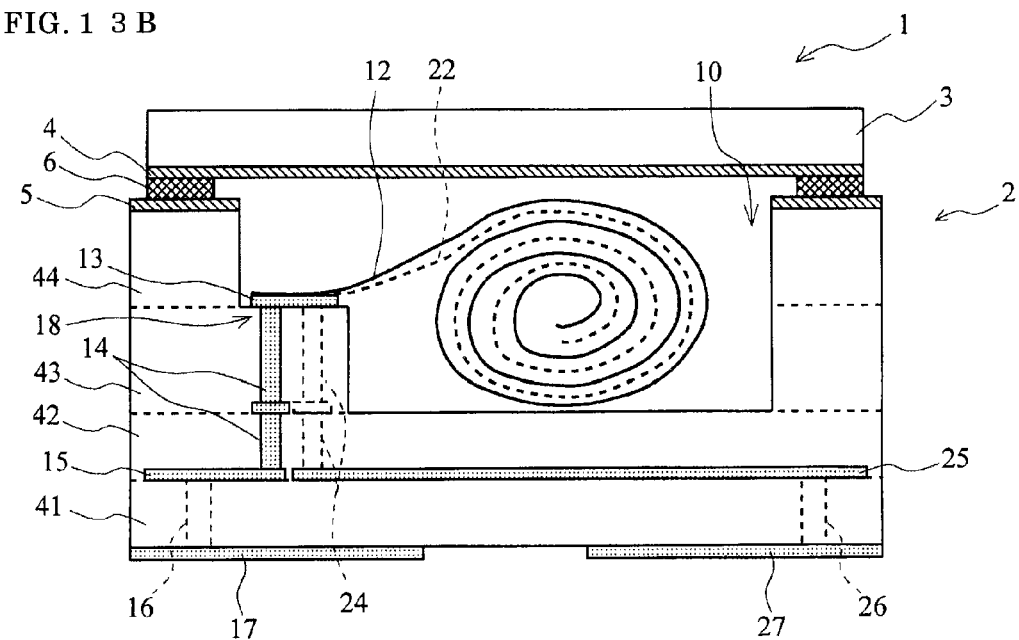
Figure 13C:
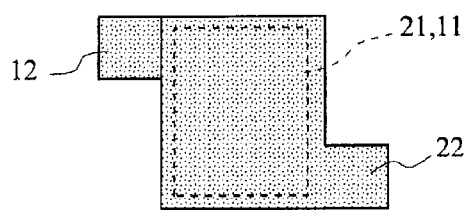
FIGS. 13C and 13D are top views of electrode portions of FIGS. 13A and 13B, respectively.

FIG. 13B is an example in which the recessed container 2 according to the second modified example is used and the electrode 11 and the electrode 21 are rolled.

Figure 13D:
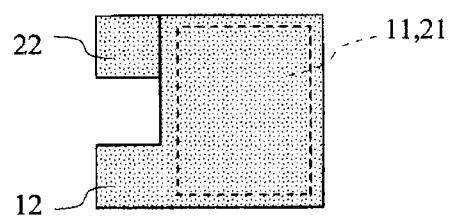

The collector 12 has a tab formed on one side of the step portion 18 and connected to the collector electrode 13, and the collector 22 has a tab (not shown) formed on the other side (when facing the figure, on the back side of the collector electrode 13) and connected to the collector electrode 23. FIG. 13D illustrates the electrode portion as viewed from above.

Although FIG. 13D exemplifies the structure of the electric double-layer capacitor provided in the container, the same structure is also applicable to a lithium-ion battery or a lithium-ion capacitor.

Ninth Modified Example

Figure 14A:
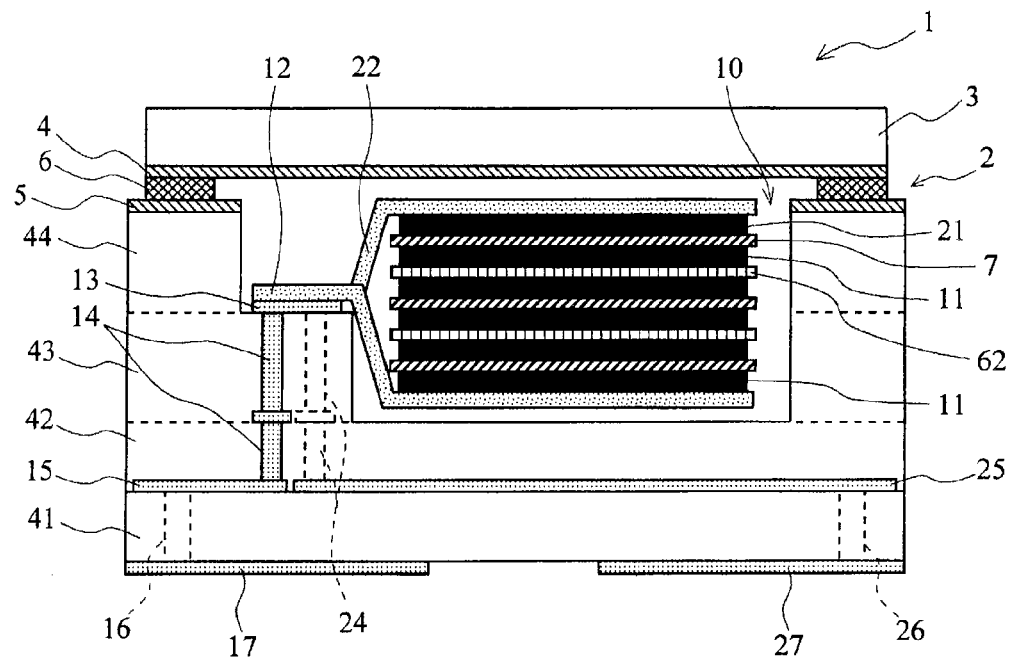
FIGS. 14A and 14B are cross-sectional views of electric double-layer capacitors according to a ninth modified example of the present invention.

FIG. 14A is a side cross-sectional view of an electric double-layer capacitor 1 according to a ninth modified example of the present invention in the lateral direction. The recessed container 2 used is the same as that in the second modified example.

An electrode portion of the electric double-layer capacitor 1 according to the ninth modified example is constituted by a unit in which a plurality of (three in the example of FIG. 14A) unit cells, in each of which the separator 7 is sandwiched between the electrode 11 and the electrode 21, are laminated in series in the thickness direction of the electric double-layer capacitor 1 (in the case of a battery instead of a capacitor, the unit is called assembled battery).

A cell separation plate 62 is provided between the unit cells.

The cell separation plate 62 separates electrochemical cells serving as units, that is, unit cells. The cell separation plate 62 used has good electrically-conductive property and heat resistance property and has density high enough to prevent liquid junction of the electrolytic solution (to prevent sideward leakage of a liquid solvent or a solute (ion) of the electrolytic solution). Specifically, a metal such as stainless steel or aluminum is used.

The uppermost electrode 21 is bonded onto the collector 22 and the lowermost electrode 11 is bonded onto the collector 12.

That is, a pair of leads (collector 12 and collector 22) is connected to one side of the recessed portion 10 in the state of an assembled battery including laminated unit cells.

In this way, a plurality of the electrodes 11 and a plurality of the electrodes 21 are laminated, which enables a series-connection of a plurality of cells in a small space. This reduces a voltage to be applied per unit cell, and hence an applicable voltage as set in the electrochemical cell 1 can be increased, resulting in excellent voltage resistance.

Note that, the recessed container 2 used may be the same as that in the embodiment, in which the step portion 18 and the step portion 28 are formed.

Although FIG. 14A exemplifies the structure of the electric double-layer capacitor provided in the container, the same structure is also applicable to a battery, a lithium-ion battery, or a lithium-ion capacitor.

Figure 14B:
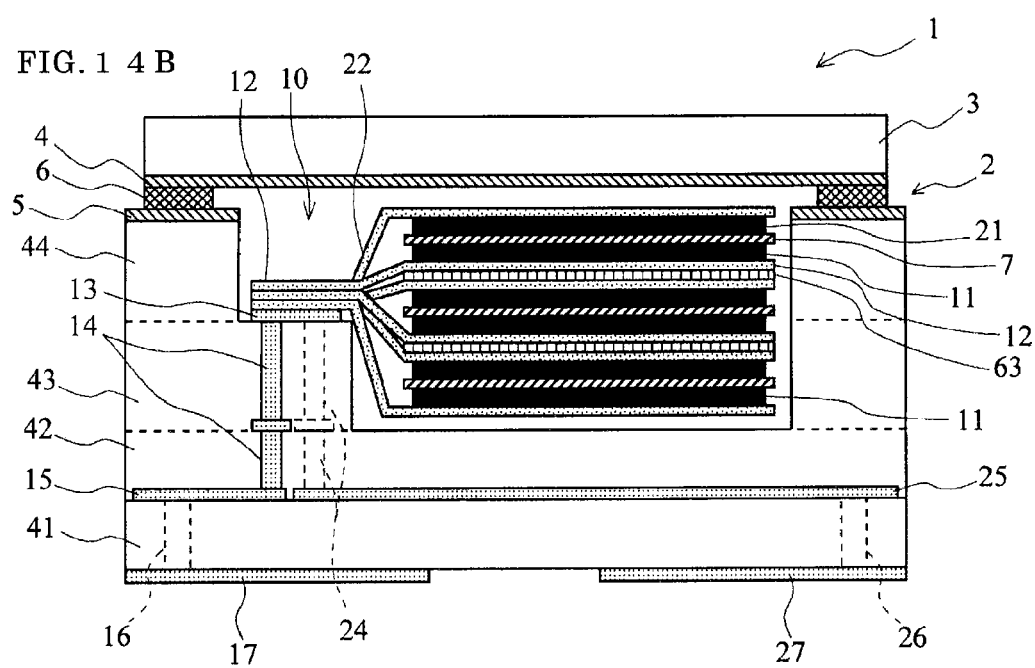

FIG. 14B is an example in the unit cells are connected in parallel.

The unit cells are constituted by electrochemical cells, in each of which the separator 7 is sandwiched by the electrodes 11 and 21 and the collectors 12 and 22 are respectively bonded onto the electrodes 11 and 21.

In this way, when the unit cells are connected in parallel, a pair of leads, that is, the collector 12 and the collector 22, is drawn out of each unit cell, and the leads are bundled together for the negative electrode and the positive electrode and bonded onto the collector electrode 13 and the collector electrode 23, respectively. As described above, when a plurality of the electrodes 11 and a plurality of the electrodes 21 are connected in parallel, the opposing area of the electrode 11 and the electrode 21 can be increased with a small space. This increases the amount of current per unit area of the electrode, resulting in excellent instantaneous discharge characteristics (pulse discharge characteristics) and rapid charge characteristics.

In the example of FIG. 14B, the unit cells are separated by cell separation sheets 63 having electrically-insulating property, thereby connecting three unit cells in parallel.

As a method for electrically insulating individual cells without using leads, a bag having electrically-insulating property and sawing three sides of the sheet material is prepared, and the unit cell may be put in the bag.

The cell separation sheet 63 is formed of an insulator in order not to short-circuit the collectors on both sides thereof, and, for example, a polyphenylene sulfide (PPS) resin, polyetheretherketone (PEEK), or glass can be used.

Although FIG. 14B exemplifies the structure of the electric double-layer capacitor provided in the container, the same structure is also applicable to a battery, a lithium-ion battery, or a lithium-ion capacitor.

Figure 14C:
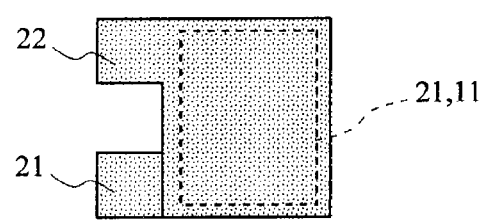
FIG. 14C is a top view of an electrode portion of FIG. 14B.

FIG. 14C is a view illustrating the electrode portion of FIG. 14B as viewed from above. Note that, the scale of illustration is reduced.

As illustrated in FIG. 14C, the collector 22 is formed into a substantially rectangular shape, and a tab to be bonded onto the collector electrode 23 is formed on one side of the side on the step portion 18 side.

Similarly, the collector 12 is also formed into a substantially rectangular shape, and a tab to be bonded onto the collector electrode 13 is formed on the other side of the side on the step portion 18 side.

Tenth Modified Example

Figure 15A:
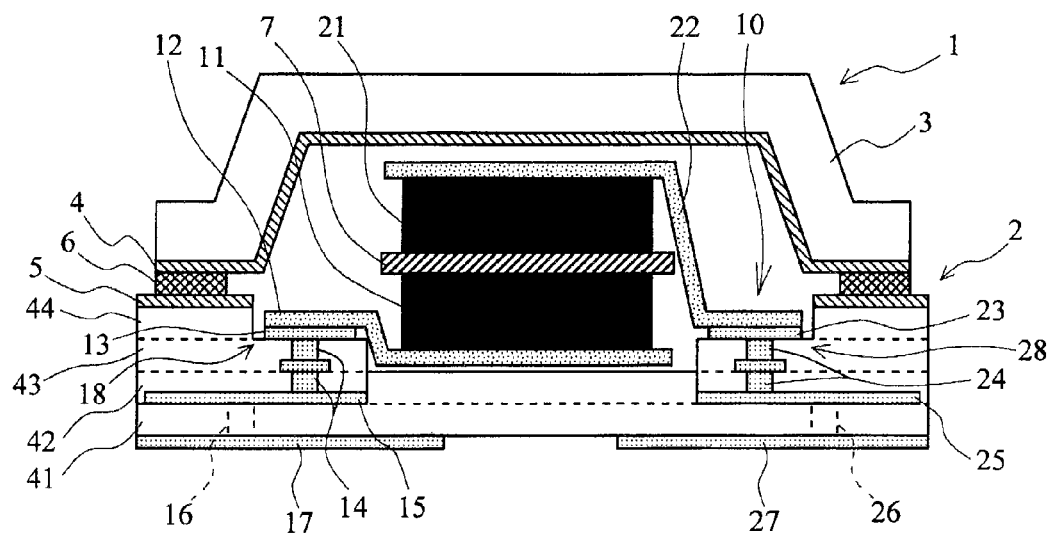
FIG. 15A is a cross-sectional view of an electric double-layer capacitor according to a tenth modified example of the present invention.

FIG. 15A is a side cross-sectional view of an electric double-layer capacitor 1 according to a tenth modified example of the present invention in the lateral direction.

This modified example is a modification of the first modified example, in which the recessed container 2 is formed thinner and the sealing plate 3 is formed into a convex shape so as to ensure the capacity of the cavity portion for accommodating the electrode portion.

In this modified example, the space created by the convex part of the electric double-layer capacitor 1 is larger than the space created by the recessed portion 10.

In this way, by thinning the recessed container 2, the depth of the recessed portion 10 becomes shallower as compared to the first modified example, which facilitates the work of placing the electrode 11 and the electrode 21.

Figure 15B:
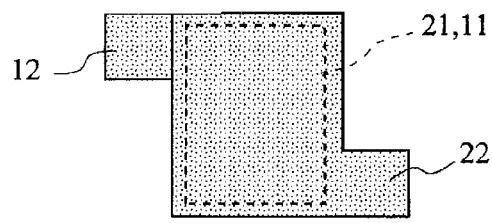
FIG. 15B is a top view of an electrode portion of FIG. 15A.

FIG. 15B is a view illustrating the electrode portion of FIG. 15A as viewed from above. Note that, the scale of illustration is reduced.

As illustrated in FIG. 15B, the collector 22 is formed into a substantially rectangular shape, and a tab to be bonded onto the collector electrode 23 is formed on one side of the side on the step portion 18 side.

Similarly, the collector 12 is also formed into a substantially rectangular shape, and a tab to be bonded onto the collector electrode 13 is formed on the other side of the side on the step portion 18 side.

Eleventh Modified Example

FIGS. 16A and 16B are side cross-sectional views of an electric double-layer capacitor 1 according to an eleventh modified example of the present invention in the lateral direction. In the eleventh modified example, the sealing plate 3, the recessed container 2, and their connection portions have the same structures as those in the embodiment described with reference to FIGS. 1A to 1C.

The eleventh modified example is different from the embodiment described with reference to FIGS. 1A to 1C in the connection state between the electrode 11 and the collector 12 and the connection state between the electrode 21 and the collector 22.

That is, while the collectors 12 and 22 in the embodiment are bonded on the upper surface side of the electrodes 11 and 21 (on the sealing plate 3 side) by conductive adhesives, the collectors 12 and 22 in this modified example are structured, as illustrated in FIG. 16A, to be bent downward at substantially 90 degrees at the boundary between portions to be bonded onto the collector electrodes 13 and 23 and portions to be bonded onto the electrodes 11 and 21. Then, the portions that are bent downward along the electrodes 11 and 21 are bonded onto the side surfaces of the electrodes 11 and 21 (side surfaces on the opposite sides of the side surfaces opposed to the separator) by conductive adhesives.

FIG. 16B illustrates an electrode unit assembly portion constituted by the electrodes 11 and 21, the separator 7, and the collectors 12 and 22 according to the eleventh modified example. Similarly to FIG. 1C, FIG. 16B exemplifies the case where the separator 7 having stretchability is used and the separator 7 is compressed by both the electrodes 11 and 21.

As illustrated in FIG. 16B, according to this modified example, the collectors 12 and 22 are not placed on the electrodes 11 and 21, and hence after the electrode unit assembly is embedded in the recessed portion 10 of the recessed container 2, an electrolytic solution (EL) can be directly dripped to the electrodes 11 and 21 from above, thereby ensuring smooth impregnation of the electrolytic solution.

Then, after the dripping of the electrolytic solution, depressurization and/or heating is carried out and the electrolyte can be impregnated into every part of the electrodes 11 and 21 without fail. The method on how to impregnate the electrolyte by depressurization and/or heating is also applicable to the embodiment and the other modified examples.

Twelfth Modified Example

Figure 17A:
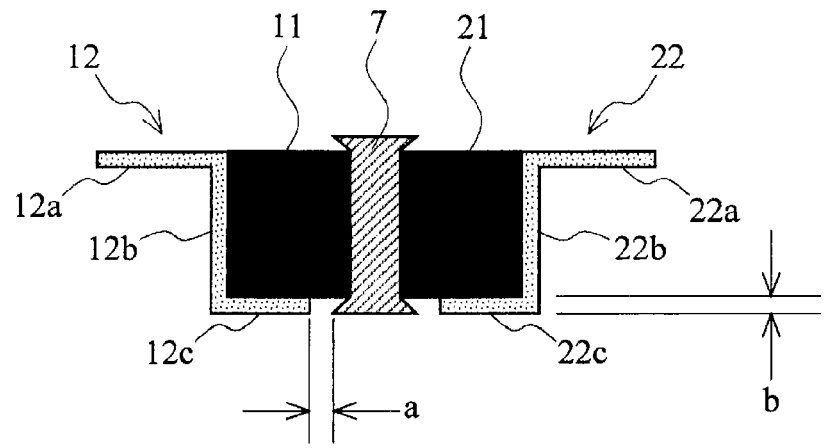
FIGS. 17A to 17C are views illustrating an electrode unit assembly portion of an electric double-layer capacitor according to a twelfth modified example of the present invention.
Figure 17B:
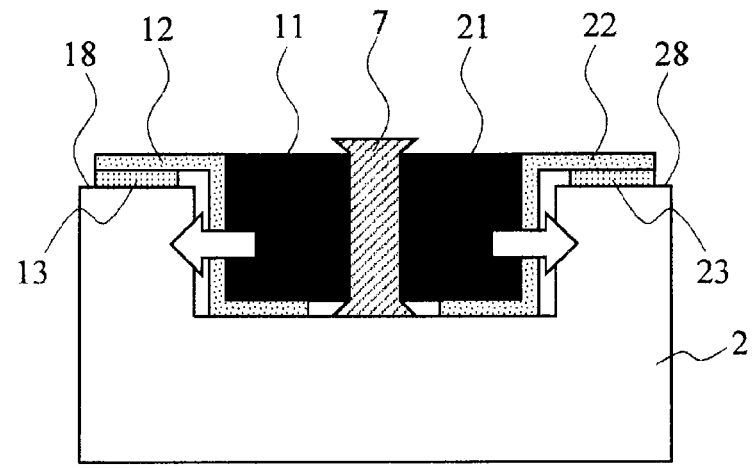
Figure 17C:
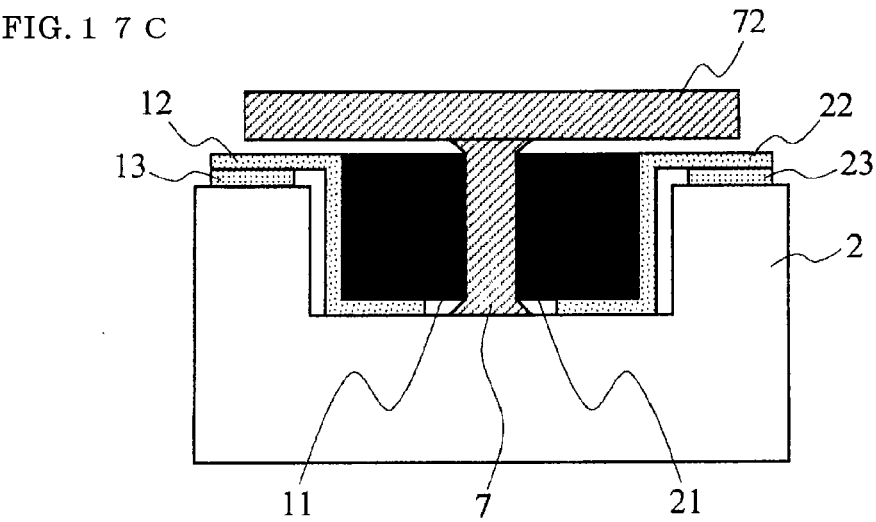

FIGS. 17A to 17C illustrate an electrode unit assembly portion of an electric double-layer capacitor 1 according to a twelfth modified example of the present invention.

As illustrated in FIG. 17A, the electrode unit assembly according to this modified example is a further modification of the bonding portions of the electrodes 11 and 21 in the collectors 12 and 22 according to the eleventh modified example.

That is, the twelfth modified example is the same as the eleventh modified example in that the collectors 12 and 22 include bonding portions 12a and 22a, which are bonded onto the collector electrodes 13 and 23, and side surface portions 12b and 22b, which are bent at substantially 90 degrees and bonded onto the electrodes 11 and 21, but is different in that the collectors 12 and 22 further include bottom surface portions 12c and 22c that are bent at substantially 90 degrees toward the center, respectively.

In this modified example, as illustrated in FIG. 17A, a gap "a" is formed between the separator 7 and each of the leading edges of the bottom surface portions 12c and 22c of the collectors 12 and 22. This makes it possible to avoid that the collector 12 and the collector 22 contact each other.

Further, a gap "b" is formed between each of the surfaces of the bottom surface portions 12c and 22c of the collectors 12 and 22 on the bottom surface side (i.e., the surfaces opposed to the recessed container 2) and each of the surfaces of the electrodes 11 and 21 on the bottom surface side. This prevents the portion of the separator 7 protruding toward the bottom surface from being crushed. Further, it is also possible to prevent the electrodes 11 and 21 from being crushed and protruded to lead to short-circuit.

FIG. 17B illustrates how the electrode unit assembly according to the twelfth modified example is assembled and disposed.

The electrode unit assembly is compressed from both outer sides of the collectors 12 and 22 toward the center (toward the separator 7), and as illustrated in FIG. 17A, the separator 7 is crushed and protrudes outside.

The electrode unit assembly in this state is inserted into the recessed portion 10 of the recessed container 2 as illustrated in FIG. 17B. According to this modified example, the side surfaces as well as (part of) the bottom surfaces of the electrodes 11 and 21 are covered with the collectors 12 and 22, respectively, and hence the outer corner parts of the bottom surfaces of the electrodes 11 and 21 are protected, thus preventing the electrodes 11 and 21 from being brought into contact with the recessed container 2 when being inserted into the recessed portion 10 and from being chipped and rounded.

In the electrode unit assembly inserted into the recessed portion 10 of the recessed container 2, the compressed separator 7 tries to return to the original state as indicated by outward white arrows and thus pushes the electrode unit assembly against the inner peripheral surfaces of the recessed portion 10. Therefore, the positions of the bonding portions 12a and 22a of the collectors 12 and 22 can be retained until the bonding portions 12a and 22a are welded onto the collector electrodes 13 and 23, which improves the workability.

Note that, in the recessed container 2 illustrated in FIG. 17B, the components related to the step portions 18 and 28 in the recessed portion 10 are simply illustrated. Actually, the recessed container 2 described above with reference to FIGS. 1A to 1C is used. In the drawings for description below, too, the shape of the recessed container 2 is illustrated as a simplified one illustrated in FIGS. 1A to 1C or FIG. 3.

FIG. 17C illustrates a further modified example of the twelfth modified example.

As illustrated in FIG. 17C, a liquid-supplementing member 72 is placed on the separator 7 and above the electrodes 11 and 21 (on the sealing plate 3 side).

Placing the liquid-supplementing member 72 can provide an effect that a shortage of electrolytic solution in the electrodes 11 and 12 can be supplemented. Note that, as the liquid-supplementing member 72, any material that can be impregnated with an electrolytic solution so as to have a liquid-supplement/retention function, for example, the material described above for the separator 7 can be used.

FIGS. 18A to 18D illustrate a method of forming the electrode unit assembly according to the twelfth modified example.

Figure 18A:
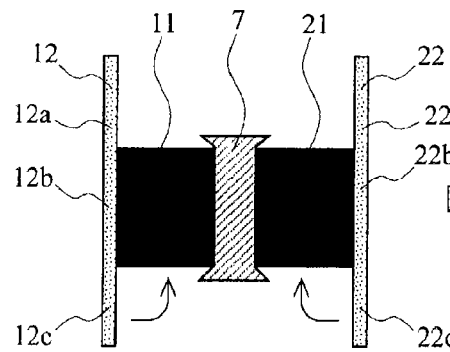
FIGS. 18A to 18D are views illustrating a method of forming the electrode unit assembly according to the twelfth modified example of the present invention.

As illustrated in FIG. 18A, the collectors 12 and 22 are bonded by conductive adhesives onto the side surfaces of the electrode 11 and the electrode 21 sandwiching the separator 7 at the center, respectively, the side surfaces being on the opposite side to the separator 7. In this case, the collectors 12 and 22 are bonded onto the electrodes 11 and 21 at the side surface portions 12b and 22b, which correspond to the regions at substantially the center excluding the upper-side bonding portions 12a and 22a and the lower-side bottom surface portions 12c and 22c.

Figure 18B:
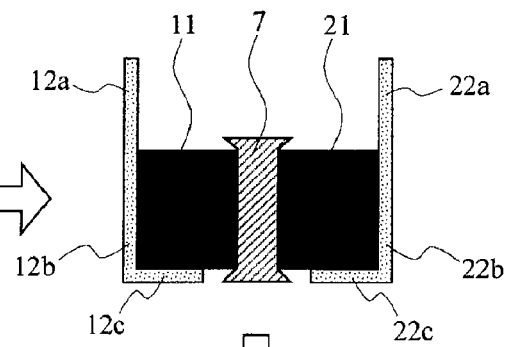

Next, as illustrated in FIG. 18B, the bottom surface portions 12c and 22c are bent toward the center where the separator 7 is present. In this case, the bottom surface portions 12c and 22c may also be bonded onto the electrodes 11 and 22 by conductive adhesives so as to increase the collection rate.

Figure 18C:
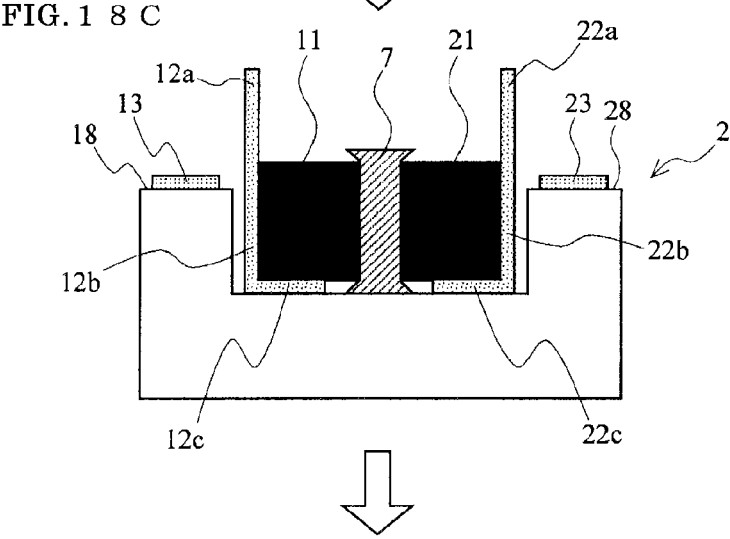

Next, as illustrated in FIG. 18C, the electrode unit assembly in which the bottom surface portions 12c and 22c of the collectors 12 and 22 are bent is inserted into the recessed portion 10 of the recessed container 2 until the bottom surface portions 12c and 22c contact the bottom surface of the recessed portion 10, while pushing the electrode unit assembly under pressure inward from both outer sides thereof so as to compress the separator 7.

At the time of insertion, the outer lower parts of both the electrodes 11 and 21 are protected by the collectors 12 and 22, respectively, and hence even if the outer lower parts contact the step portions 18 and 28 or the like of the recessed container 2, it is possible to prevent breakage thereof.

Figure 18D:
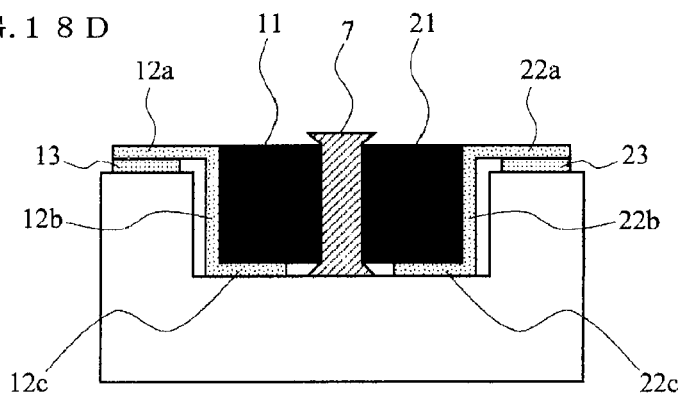

After the electrode unit assembly is accommodated into the recessed portion 10, as illustrated in FIG. 18D, the bonding portions 12a and 22a of the collectors 12 and 22 are bent outward at substantially 90 degrees until contacting the collector electrodes 13 and 23, respectively.

Note that, in the description above, the bonding portions 12a and 22a are bent outward after the electrode unit assembly is accommodated into the recessed portion 10, but alternatively, the bonding portions 12a and 22a may be bent before the electrode unit assembly is accommodated into the recessed portion 10.

Next, the bent bonding portions 12a and 22a are welded onto the collector electrodes 13 and 23, respectively. Resistance welding and laser welding are available, and bonding by a conductive adhesive is also available.

Next, the process proceeds to an electrolytic solution injection step. Above the electrodes 11 and 21 is an open space, and hence an electrolytic solution is injected to the electrodes 11 and 21 and the separator 7 from the open space.

Thirteenth Modified Example

Figure 19:
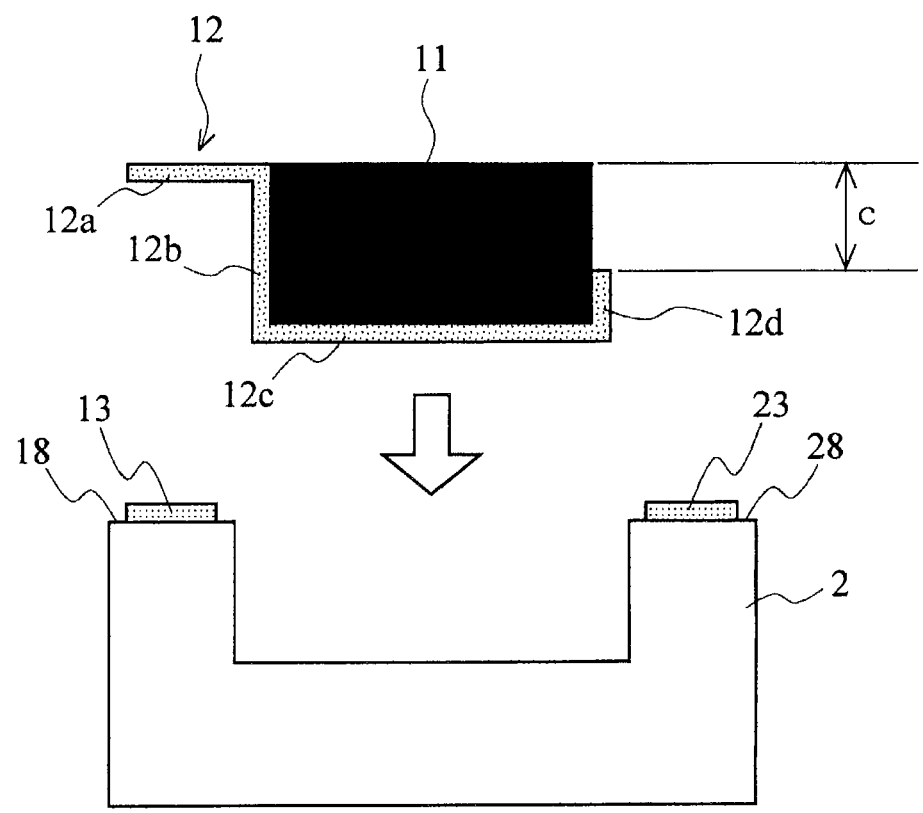
FIG. 19 is a view illustrating a part of an electrode unit assembly according to a thirteenth modified example of the present invention.

FIG. 19 illustrates a part of an electrode unit assembly of an electric double-layer capacitor 1 according to a thirteenth modified example of the present invention.

The thirteenth modified example is, similarly to the above-mentioned twelfth modified example, a modified example regarding the shape of the collector and aimed at protecting the electrode. While the twelfth modified example is a modification in which the electrodes 11 and 21 are disposed horizontally on both sides of the separator 7, the thirteenth modified example is a modified example in which the electrodes 11 and 21 are disposed vertically on both sides of the separator 7 (e.g., in the first and second modified examples).

In the thirteenth modified example, as illustrated in FIG. 19, the collector 12 includes the upper-side bonding portion 12a, the side surface portion 12b, and the bottom surface portion 12c, and further an opposite-side side surface portion 12d. That is, the collector 12 is bend along the electrode 11, with the length increased by the length of the opposite-side side surface portion 12d as compared to the first and second modified examples.

Further, in the thirteenth modified example, both the side surface portion 12b and the opposite-side side surface portion 12d may be bonded onto the electrode 11 by a conductive adhesive.

According to the thirteenth modified example described above, when the electrode 11 and the electrode 21 are disposed vertically, the lower corners of the electrode 11 (or the electrode 21) that is disposed on the lower side (on the bottom surface side of the recessed container 2) can be protected by the side surface portion 12b, the bottom surface portion 12c, and the opposite-side side surface portion 12d.

Further, there is no fear of crushing of the electrode, and hence the reduction of capacitance and the occurrence of short-circuit of members chipped off the electrode 11 can be prevented.

Still further, a gap "c" is formed between the leading edge of the opposite-side side surface portion 12d and the separator 7. This makes it possible to avoid bringing the opposite-side side surface portion 12d of the collector 12 into contact with the collector 22.

The above description of the thirteenth modified example is about the collector 12 that is bonded onto the electrode 11. Regarding the collector 22 of the electrode 21, on the other hand, the collector 22 is not inserted on the lower side of the step portion 18 and hence the opposite-side side surface portion 12d is not formed. However, in the case where the electrode 21 and the collector 22 are provided as lower ones instead, an opposite-side side surface portion 22d is formed in the collector 22.

Note that, the opposite-side side surface portions 12d and 22d may be formed in the collector 12 of the electrode 11 and the collector 22 of the electrode 21, respectively, as illustrated in FIG. 19 so as to reduce the number of types of components.

Fourteenth Modified Example

A fourteen modified example of the present invention, which is a modification regarding the size of the separator 7, is a modified example in which the electrodes 11 and 21 are disposed vertically on both sides of the separator 7 (e.g., in the first and second modified examples).

Figure 20A:
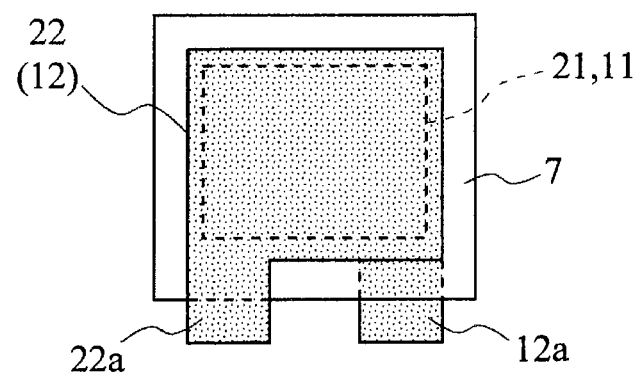
FIGS. 20A and 20B are views illustrating a dimensional relationship between a separator and collectors according to a fourteenth modified example of the present invention.
Figure 20B:
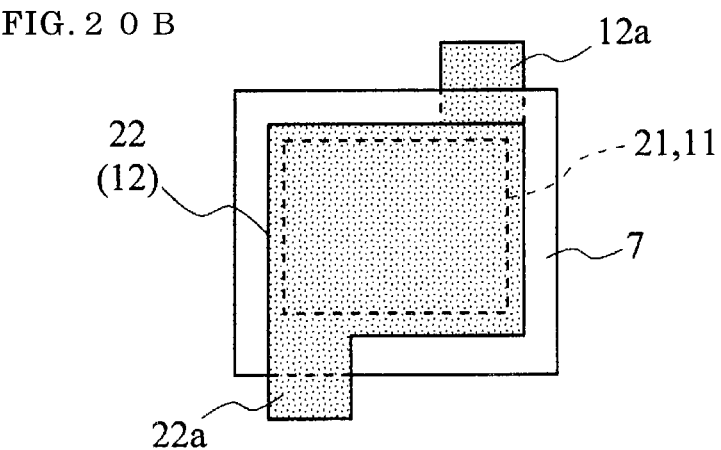

In the first and second modified examples described above with reference to FIG. 3 and FIGS. 4A to 4C, the separator 7 is formed to have substantially the same size as those of the collectors 12 and 22 (excluding the bonding portions to be bonded to the collector electrodes 13 and 23). However, in the fourteenth modified example 14, as illustrated in FIGS. 20A and 20B, the separator 7 is formed to be larger in size than the collectors 12 and 22. The square separator 7 is disposed so that all the sides thereof are positioned outside the collectors 12 and 22.

Considering that the separator 7 can shrink, the separator 7 is formed and disposed so that the respective sides thereof are positioned outside the sides of the collectors 12 and 22 by a length of 2.5% or more, more preferably 6% or more of that of the sides of the collectors 12 and 22.

FIG. 20A illustrates the case where the separator 7 is increased in size corresponding to the second modified example illustrated in FIGS. 4A to 4C. FIG. 20B illustrates the case where the separator 7 is increased in size corresponding to the first modified example illustrated in FIG. 3.

By increasing the size of the separator 7 in this way, it is possible to prevent the following events that occur due to a positional error of the disposed electrodes at the time of assembly or a dimensional error or a positional error at the time of cutting the separator. That is, it is possible to prevent short-circuit between the bonding portion 12a of the collector 12 and the collector 22, short-circuit between the bonding portion 22a of the collector 22 and the collector 12, short-circuit between the collector 12 and the collector electrode 23, and short-circuit between the collector 22 and the collector 13.

Figure 21A:
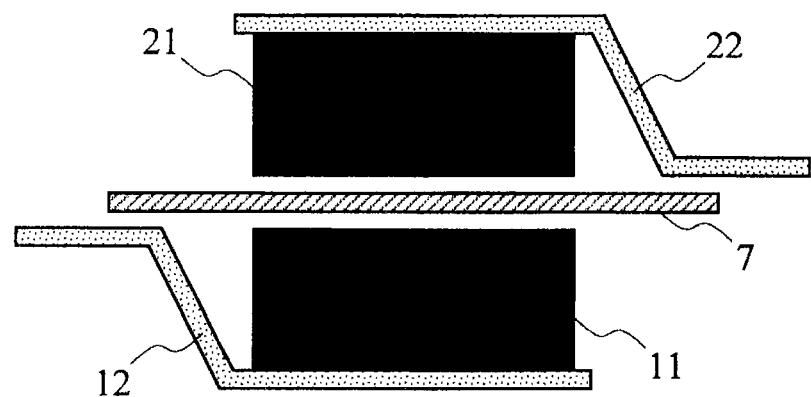
FIGS. 21A and 21B are side cross-sectional views of an electrode unit assembly according to the fourteenth modified example of the present invention.

FIG. 21A is a side cross-sectional view according to the modified example illustrated in FIG. 20B.

Figure 21B:
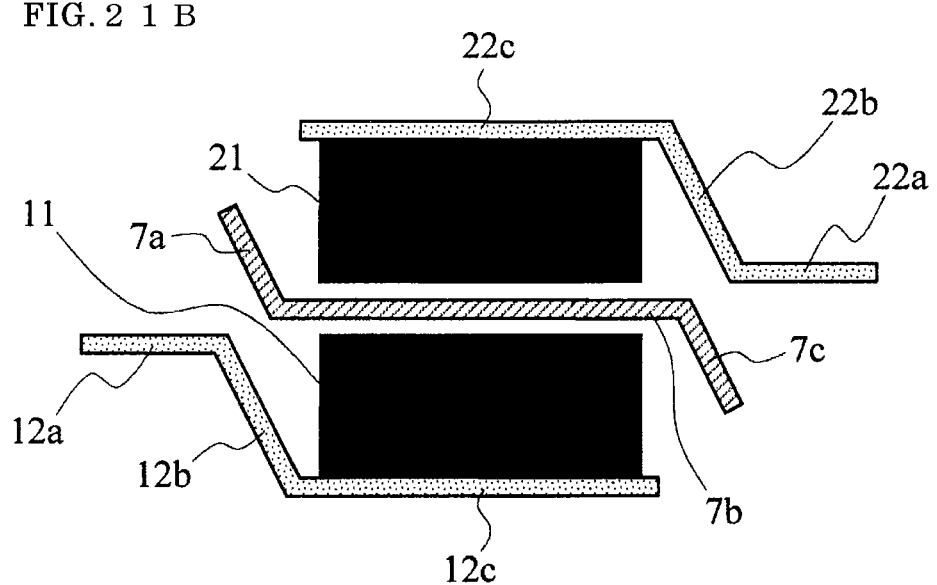

FIG. 21B is a further modification in which both end portions 7a and 7c of the separator 7 (both end portions which are outside a portion 7b sandwiched by both the electrodes 11 and 21 and on the side where the bonding portion 12a and the bonding portion 22a are placed) are bent asymmetrically so as to prevent short-circuit.

One end portion 7a of the separator 7 is bent in the same direction as the bonding portion 12a provided on the side where the end portion 7a is placed, that is, in the upward direction as illustrated in FIG. 21B.

The other end portion 7c of the separator 7 is bent in the same direction as the bonding portion 22a provided on the side where the end portion 7c is placed, that is, in the downward direction.

Figure 22A:
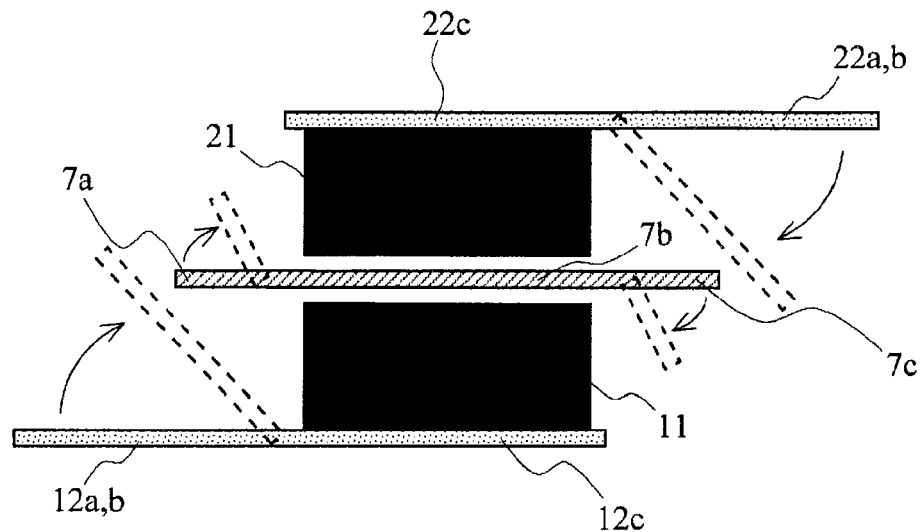
FIGS. 22A to 22C are views illustrating a method of forming the electrode unit assembly according to the fourteenth modified example of the present invention.
Figure 22B:
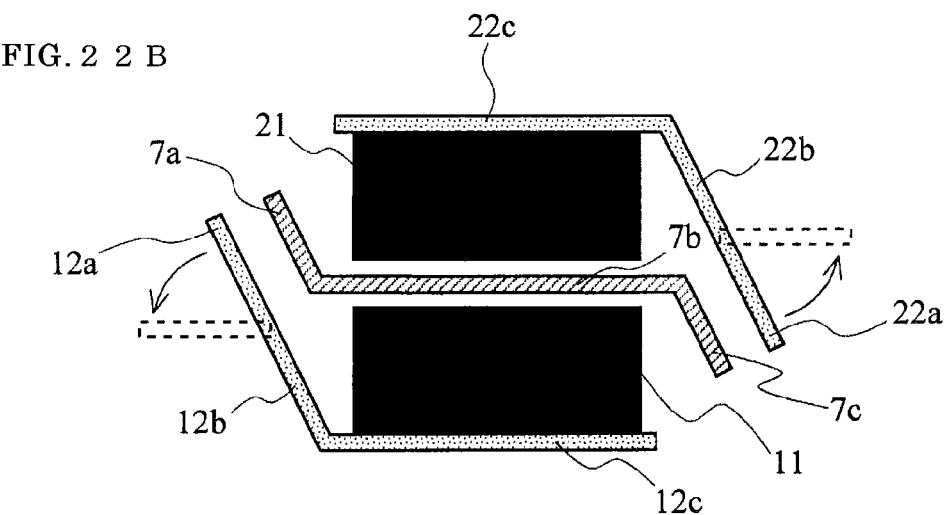
Figure 22C:
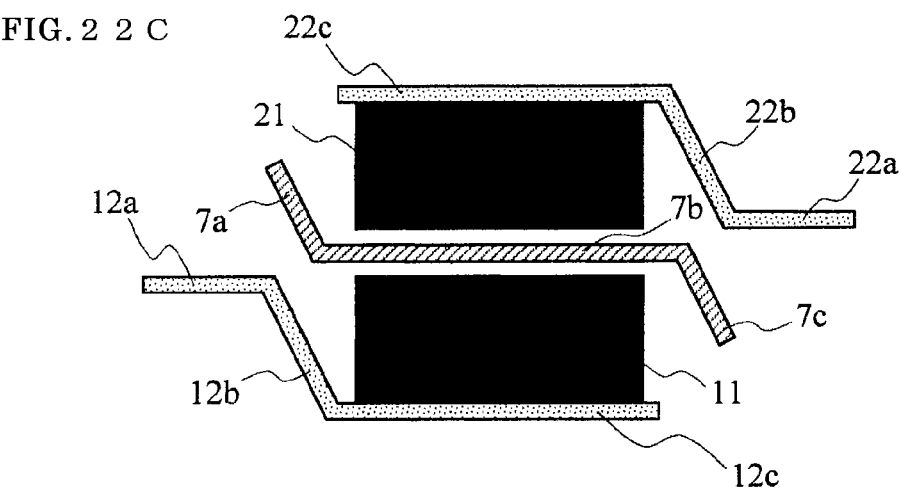

FIGS. 22A to 22C illustrate a method of forming the electrode unit assembly illustrated in FIGS. 21A and 21B.

As illustrated in FIG. 22A, the separator 7 is sandwiched by one surface of the electrode 11, on the other surface of which the bottom surface portion 12c of the collector 12 is bonded by a conductive adhesive, and one surface of the electrode 21, on the other surface of which the bottom surface portion 22c of the collector 22 is bonded by a conductive adhesive.

Then, as illustrated in FIG. 22B, the end portion 7a of the separator 7 on the bonding portion 12a side is bent toward the collector 22 (upward in the figure), and the end portion 7c on the bonding portion 22a side is bent toward the collector 12 (downward in the figure).

Further, the side surface portion 12b (bonding portion 12a) of the collector 12 is bent toward the separator 7 (upward) at the end portion of the electrode 11, and the side surface portion 22b (bonding portion 22a) of the collector 22 is bent toward the separator 7 (downward) at the end portion of the electrode 21.

In addition, the bonding portion 12a and the bonding portion 22a are bent so as to be substantially parallel to each other, thereby forming the electrode unit assembly illustrated in FIG. 22C.

Fifteenth Modified Example

Figure 23A:
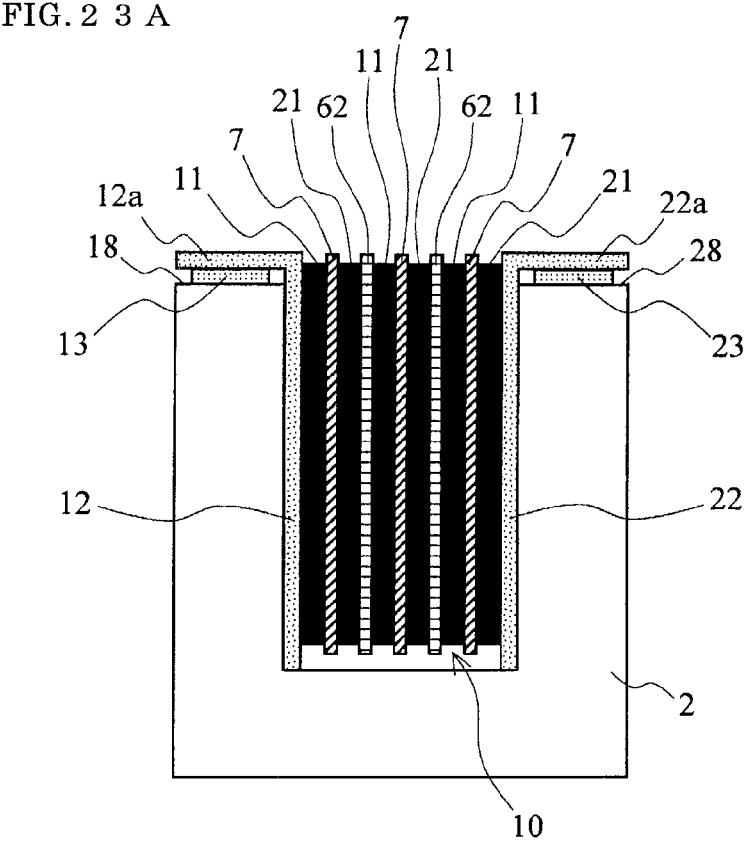
FIGS. 23A and 23B are cross-sectional views of an electrode unit assembly according to a fifteenth modified example of the present invention.
Figure 23B:
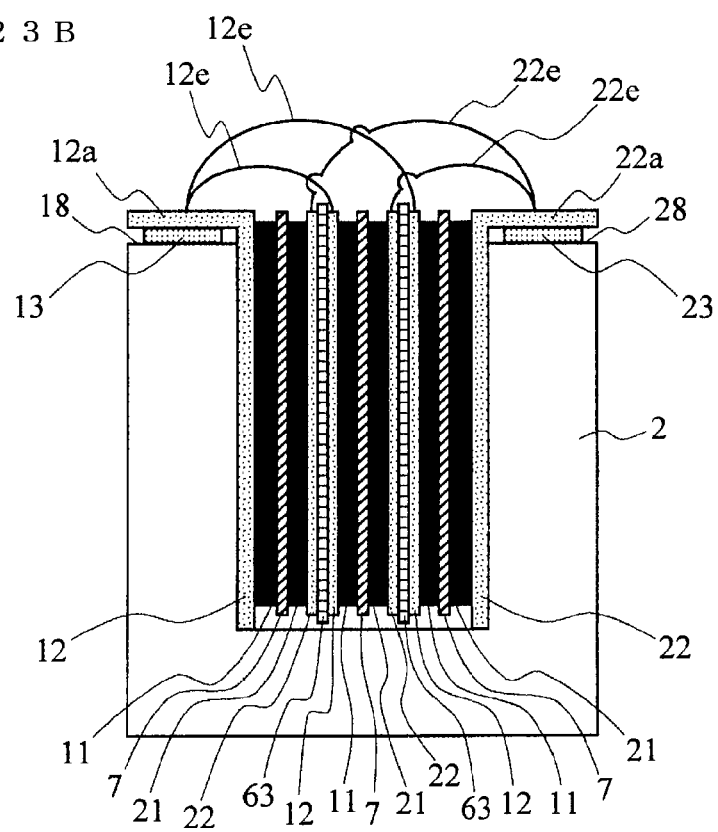
Figure 24:
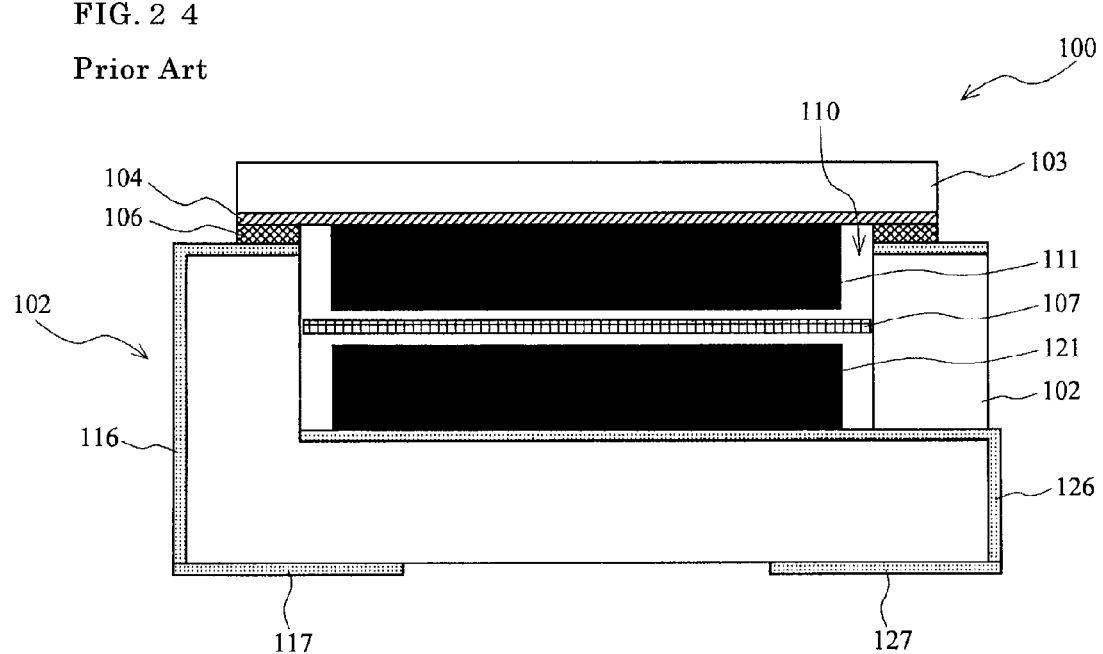
FIG. 24 is a cross-sectional view of a conventional electric double-layer capacitor.

FIGS. 23A and 23B are a modified example of using a plurality of unit cells, in each of which the separator 7 is sandwiched by the electrode 11 and the electrode 21. FIG. 23A illustrates the case where the unit cells are connected in series. FIG. 23B illustrates the case where the unit cells are connected in parallel.

While the ninth modified example illustrated in FIGS. 14A to 14C is a modified example in which the respective unit cells are disposed in the recessed container 2 so as to be parallel to the sealing plate 3, the fifteenth modified example is a modified example in which the respective unit cells are disposed in the recessed container 2 at 90 degrees with respect to the sealing plate 3 as illustrated in FIGS. 23A and 23B.

FIG. 23A is an example in which, similarly to FIG. 14A, the unit cells are connected in series.

As illustrated in FIG. 23A, an electrode unit assembly used is a unit in which a plurality of (n) unit cells, in each of which the separator 7 is sandwiched between the electrode 11 and the electrode 21, are laminated in the thickness direction of the electric double-layer capacitor 1 through the intermediation of the cell separation plates 62. The cell separation plates 62 used are the same as those in the ninth modified example.

Then, among the unit cells connected in series, the electrode 11 positioned on one outer side and the electrode 21 positioned on the other outer side are bonded onto the collector 12 and the collector 22 by conductive adhesives, respectively, thereby constituting the electrode unit assembly.

On the other hand, in the recessed container 2, unlike the ninth modified example illustrated in FIG. 14A, the step portion 18 and the step portion 28 are formed. Accordingly, the recessed container 2 is formed to have a deeper depth inside the step portions 18 and 28 correspondingly to the length of the unit cells.

After the electrode unit assembly is accommodated in the recessed portion 10 of the recessed container 2, the bonding portion 12a of the collector 12 is welded onto the collector electrode 13 formed on the step portion 18, and the bonding portion 22a of the collector 22 is welded onto the collector electrode 23 formed on the step portion 28.

FIG. 23B is an example in which, similarly to FIG. 14B, the unit cells are connected in parallel.

As illustrated in FIG. 23B, the unit cell is constituted by an electrochemical cell, in which the separator 7 is sandwiched by the electrodes 11 and 21 and the collectors 12 and 22 are respectively bonded onto the electrodes 11 and 21. The respective unit cells are separated from one another by the cell separation sheets 63 having electrically-insulating property, thereby connecting three unit cells in parallel. The cell separation sheets 63 used are the same sheets as those in the ninth modified example.

Then, similarly to the case of a series-connection, the collector 12 that is bonded to the electrode 11 positioned on one outer side has a bonding portion 12a which is bent outward and welded onto the collector electrode 13.

The collector 22 that is bonded to the electrode 21 positioned on the other outer side has a bonding portion 22a which is bent outward and welded onto the collector electrode 23.

On the other hand, the other collectors 12 than the collector 12 positioned on the outer side (the ones bonded to the electrode 11) are welded to the collector electrode 13 via lead wires 12e.

The other collectors 22 than the collector 22 positioned on the outer side (the ones bonded to the electrode 21) are welded to the collector electrode 23 via lead wires 22e.

Note that, instead of the lead wires 12e and 22e, the collectors 12 and 22 may be welded to the collector electrodes 13 and 23 via narrow lead foils (plates) that are formed integrally with the collectors 12 and 22, respectively.

In the case of using the lead foil (plate), the width is desirably small enough to ensure a region for dripping an electrolytic solution to the electrodes 11 and 21 and the separator 7 from above, for example, ¼ of the width of the electrode 11 or smaller.

Note that, in order to prevent short-circuit between the lead wire 12e or the lead foil and the electrode 21 and short-circuit between the lead wire 22e or the lead foil and the electrode 11, the cell separation sheets 63 may be placed between the lead wires 12e and 22e or the lead foils and the electrodes 11 and 21. Similarly to the case of using the lead foil, the width of the cell separation sheets is also suppressed to such a width that does not hinder the dripping of the electrolytic solution.

As described above, according to the fifteenth modified example, in addition to the effect obtained by placing a plurality of unit cells described in the ninth modified example, the following effect can be obtained. Because above the respective unit cells is an open space, after the unit cells are embedded in the recessed container 2, an electrolytic solution (EL) can be directly dripped to the electrodes 11 and 21 from above, thereby ensuring smooth and reliable impregnation of the electrolytic solution.

In the embodiment and the modified examples thereof, the electric double-layer capacitor is described as an example of the electrochemical cell constituting an electronic component. However, as described above, the electronic component may include electrochemical cells of other types, such as a non-aqueous electrolytic cell.

For example, the electronic component may be a battery including: as a negative electrode (electrode 11), a sheet obtained by forming an electrode containing silicon oxide (50 wt %) activated by metallic lithium, a conduction aid (40 wt %), and a polyacrylic binding agent (10 wt %) on a copper foil; as a positive electrode (electrode 21), a sheet obtained by forming an electrode containing an active material (85 wt %) in which elements of lithium-manganese-oxygen have a spinel type crystal structure, a conduction aid (10 wt %), and a polyvinylidene difluoride (PVdF)-based (or PTFE-based) binding agent (5 wt %) on an aluminum foil; a separator made of a glass fiber; and an electrolytic solution obtained by dissolving 1 M $LiN(SO_2CF_3)_2$ in PC. Here, each size of the positive electrode and the negative electrode may be set to 1 mm (length)×1.5 mm (width)×0.2 mm (thickness).

Further, in addition to the above-mentioned active material of the positive electrode, a metal oxide containing lithium, such as $Li_4Ti_5O_{12}$, $Li_4Mn_5O_{12}$, or $LiCoO_2$ may be used. Further, as the active material of the negative electrode, a silicon oxide such as Li—Si—O, a lithium alloy such as Li-AL, and the like may be used. In addition, by using an electrolytic solution obtained by dissolving 1 M $LiBF_4$ in PC, a lithium-ion battery may be formed. In this case, a conduction aid or a binding agent may be used in combination with each active material. Further, the electronic component may be a lithium-ion capacitor in which one electrode is a half cell and the other is an activated carbon electrode.

By way of the embodiment and the respective modified examples described above, the following structures can be obtained.

In the electric double-layer capacitor 1 according to the embodiment, the recessed container 2 includes the recessed portion 10, and the step portion 18 and the step portion 28 are formed in the middle of the inner peripheral surfaces of the recessed portion 10, and hence the recessed container 2 serves as a recessed container including a recessed portion in which step portions are formed between the bottom surface and the upper end portion.

The collector electrode 13 is formed on the upper surface of the step portion 18 and is electrically conductive to the external electrode 17, and hence serves as a first conductor that reaches the outside of the recessed container from the upper surface of the step portion.

The collector electrode 23 is formed on the upper surface of the step portion 28 and is electrically conductive to the external electrode 27, and hence serves as a second conductor that reaches the outside of the recessed container from the upper surface of the step portion.

The electrode 11 is electrically connected to the collector electrode 13 on the upper surface of the step portion 18, and hence serves as a first electrode that is connected to the first conductor on the upper surface of the step portion.

The electrode 21 is electrically connected to the collector electrode 23 on the upper surface of the step portion 28, and hence serves as a second electrode that is connected to the second conductor on the upper surface of the step portion.

Further, the electrolyte sealingly filled in the recessed portion 10 serves as an electrolyte in contact with the first electrode and the second electrode. The sealing plate 3 seals the recessed portion 10 and hence serves as a sealing member that is bonded onto the upper end portion of the recessed portion to seal the recessed portion.

The recessed container 2 is formed by laminating the sheet materials 41 to 44 corresponding to the shape of the recessed portion 10, and hence the recessed container is formed by laminating sheet materials corresponding to the shape of the recessed portion.

The collector 12 is placed on the electrode 11 and hence serves as a first collector placed on the first electrode. The collector 22 is placed on the electrode 21 and hence serves as a second collector placed on the second electrode.

Then, the electrode 11 is electrically connected to the collector electrode 13 via the collector 12 and the electrode 21 is electrically connected to the collector electrode 23 via the collector 22, and hence the first electrode is connected to the first conductor via the first collector and the second electrode is connected to the second conductor via the second collector.

The step portion of the electric double-layer capacitor 1 according to this embodiment includes the step portion 18 and the step portion 28, and the collector electrode 13 is formed on the step portion 18 while the collector electrode 23 is formed on the step portion 28. Therefore, the step portion includes a first step portion and a second step portion, and the first conductor is formed on the first step portion while the second conductor is formed on the second step portion.

The step portion 18 and the step portion 28 have the same height, and hence an upper surface of the first step portion and an upper surface of the second step portion are formed on the same plane.

In the second modified example, the collector electrode 13 is formed on one side of the step portion 18 while the collector electrode 23 is formed on the other side of the step portion 18, and hence the first conductor is formed on one side of the step portion while the second conductor is formed on the other side of the step portion.

In the first modified example, the electrode 11 and the electrode 21 are opposed to each other in the depth direction of the recessed portion 10, while in the embodiment, the electrode 11 and the electrode 21 are opposed to each other in the direction perpendicular to the depth direction of the recessed portion 10, and the electrolyte is sealingly filled in the recessed portion 10. Therefore, the first electrode and the second electrode are opposed to each other in the depth direction of the recessed portion or the direction perpendicular to the depth direction, and the electrolyte exists at least between opposing surfaces of the first electrode and the second electrode.

In the embodiment, the intermediate wiring portion 15 and the intermediate wiring portion 25 are provided on the upper surface of the sheet material 41 so as to obtain wiring of predetermined layout, and hence each of the first conductor and the second conductor forms wiring of predetermined layout in a wiring layer formed between the bottom surface of the recessed portion and a peripheral bottom surface of the recessed container, and is connected to an external electrode which is formed at a predetermined position of the peripheral bottom surface of the recessed container.

The electric double-layer capacitor 1 according to the embodiment has the rectangular bottom surface, on which the external electrode 17a and the external electrode 17b are provided at the corner parts on one diagonal while the external electrode 27a and the external electrode 27b are provided at the corner parts on the other diagonal. Therefore, the recessed container has a rectangular bottom surface, and the external electrodes include a first external electrode, which is formed at each of the corner parts on one of the two diagonals of the bottom surface and is connected to the first conductor, and a second external electrode, which is formed at each of the corner parts on the other diagonal and is connected to the second conductor.

The embodiment has been described above by way of the structure of the electric double-layer capacitor, but the same structure is also applicable to a lithium-ion battery or a lithium-ion capacitor by selecting appropriate types of electrode active materials and electrolytic solutions.

Further, the electric double-layer capacitor 1 can be used, for example, in backup power sources for a memory and a clock for various home appliances such as a smart meter, transport equipment such as an automobile, mobile phones, and other similar uses.

In this case, the mobile phone serves as an electronic device including the electronic component constituted by the electric double-layer capacitor 1, charging means for charging the electronic component simultaneously with the attachment of a main power battery, another electronic component that exerts a predetermined function such as a memory and a clock, and power supply means for supplying power to the another electronic component with the use of electric charges that are stored in the electric double-layer capacitor 1 in such a manner that the electric charges that have been stored in the electric double-layer capacitor 1 are discharged so that power is supplied to the memory and the clock.

In addition, the electric double-layer capacitor 1 is excellent in instantaneous discharge characteristics (pulse discharge characteristics) and rapid charge characteristics, and is therefore capable of supporting power as an auxiliary function for a main power source in such equipment that consumes current instantaneously, such as an LED flash of a mobile phone.

Further, as structures of an electronic component and an electronic device, the following structures a to i may be employed.

(1) Structure a

An electronic component, including:

a recessed container including a recessed portion, the recessed portion having a step portion formed between a bottom surface and an upper end portion;

a first conductor, which reaches an outside of the recessed container from an upper surface of the step portion;

a second conductor, which reaches the outside of the recessed container from the upper surface of the step portion;

a first electrode, which is connected to the first conductor on the upper surface of the step portion;

a second electrode, which is connected to the second conductor on the upper surface of the step portion;

an electrolyte in contact with the first electrode and the second electrode; and a sealing member, which is bonded onto the upper end portion of the recessed portion, for sealing the recessed portion.

(2) Structure b

An electronic component according to structure a, in which the recessed container is formed by laminating sheet materials corresponding to a shape of the recessed portion.

(3) Structure c

An electronic component according to structure a or b, further including:

a first collector, which is placed on the first electrode; and a second collector, which is placed on the second electrode, in which the first electrode is connected to the first conductor via the first collector, and the second electrode is connected to the second conductor via the second collector.

(4) Structure d

An electronic component according to structure a, b, or c, in which:

the step portion includes a first step portion and a second step portion; and the first conductor is formed on the first step portion, and the second conductor is formed on the second step portion.

(5) Structure e

An electronic component according to structure d, in which an upper surface of the first step portion and an upper surface of the second step portion are formed on the same plane.

(6) Structure f

An electronic component according to structure a, b, or c, in which the first conductor is formed on one side of the step portion, and the second conductor is formed on another side of the step portion.

(7) Structure g

An electronic component according to any one of structures a to f, in which the first electrode and the second electrode are opposed to each other in one of a depth direction of the recessed portion and a direction perpendicular to the depth direction, and the electrolyte exists at least between opposing surfaces of the first electrode and the second electrode.

(8) Structure h

An electronic component according to any one of structures a to g, in which each of the first conductor and the second conductor forms wiring of predetermined layout in a wiring layer formed between the bottom surface of the recessed portion and a peripheral bottom surface of the recessed container, and is connected to an external electrode which is formed at a predetermined position of the peripheral bottom surface of the recessed container.

(9) Structure i

An electronic component according to structure h, in which:

the recessed container includes a bottom surface of a rectangular shape; and the external electrode includes:

a first external electrode, which is formed at each of corner parts on one of two diagonals of the bottom surface and is connected to the first conductor; and a second external electrode, which is formed at each of corner parts on another of the diagonals and is connected to the second conductor.

(10) Structure j

An electronic device, including:

the electronic component according to any one of structures a to f;

charging means for charging the electronic component;

another electronic component that exerts a predetermined function; and power supply means for supplying power to the another electronic component with use of electric charges that are stored by the charging means.

What is claimed is:

1. An electronic component comprising:

a recessed container including a recessed portion, the recessed portion having a step portion between a bottom surface and an upper end portion, wherein the recessed container comprises a plurality of laminated sheets defining an inner surface of the recessed portion and wherein the step portion includes a first step portion and a second step portion and an upper surface of the first step portion and an upper surface of the second step portion are on the same plane;

a first conductor that extends outside of the recessed container from an upper surface of the step portion by way of through-holes in the recessed container;

a second conductor that extends outside of the recessed container from the upper surface of the step portion by way of through-holes in the recessed container, wherein the first conductor resides on the first step portion, and the second conductor resides on the second step portion;

a bottom laminated sheet of the plurality of laminated sheets having a first wiring layer thereon connected to laterally displaced through-holes of the first conductor and a second wiring layer thereon connected to laterally displaced the through-holes of the second conductor;

a first electrode connected to the first conductor on the upper surface of the step portion by a first collector;

a second electrode connected to the second conductor on the upper surface of the step portion by a second collector;

an electrolyte in contact with the first electrode and the second electrode; and a sealing plate bonded to the upper end portion of the recessed portion by a sealing material and sealing the recessed portion.

2. An electronic component according to claim 1, wherein the first collector contacts the first electrode and extends into the recessed portion therefrom; and the second collector contacts the second electrode and extends into the recessed portion therefrom, wherein the first electrode is connected to the first conductor via the first collector, and the second electrode is connected to the second conductor via the second collector.

3. An electronic component according to claim 1, wherein the first electrode and the second electrode are opposed to each other in one of a depth direction of the recessed portion or a direction perpendicular to the depth direction, and the electrolyte resides at least between opposing surfaces of the first electrode and the second electrode.

4. An electronic component according to claim 1, wherein, the first and second wiring layers route positive and negative electrical connections to respective external electrodes at predetermined positions in a peripheral region of the bottom laminated sheet.

5. An electronic component according to claim 4, wherein:
the bottom laminated sheet includes a bottom surface of a rectangular shape; and
the respective external electrodes include:
a first external electrode at each of corner parts on one of two diagonals of the bottom surface and connected to the first conductor by the first wiring layer; and
a second external electrode at each of corner parts on another of the diagonals and connected to the second conductor by the second wiring layer.

6. An electronic device, comprising:
the electronic component according to claim 1;
charging means for charging the electronic component;
another electronic component that exerts a predetermined function; and
power supply means for supplying power to the another electronic component with use of electric charges that are stored by the charging means.

* * * * *